US011465858B2

(12) United States Patent
Douglas et al.

(10) Patent No.: US 11,465,858 B2
(45) Date of Patent: Oct. 11, 2022

(54) ACTUATED AIR CONVEYOR DEVICE FOR MATERIAL SORTING AND OTHER APPLICATIONS

(71) Applicant: AMP Robotics Corporation, Louisville, CO (US)

(72) Inventors: Cameron D. Douglas, Boulder, CO (US); Mark Baybutt, Superior, CO (US); Matanya B. Horowitz, Golden, CO (US)

(73) Assignee: AMP Robotics Corporation, Louisville, CO (US)

( * ) Notice: Subject to any disclaimer, the term of this patent is extended or adjusted under 35 U.S.C. 154(b) by 0 days.

(21) Appl. No.: 17/122,926

(22) Filed: Dec. 15, 2020

(65) Prior Publication Data

US 2021/0206586 A1    Jul. 8, 2021

Related U.S. Application Data

(60) Provisional application No. 62/948,404, filed on Dec. 16, 2019.

(51) Int. Cl.
*B65G 47/90* (2006.01)
*B25J 15/06* (2006.01)
*B07C 5/36* (2006.01)
*B07C 5/342* (2006.01)

(52) U.S. Cl.
CPC ............ *B65G 47/902* (2013.01); *B07C 5/368* (2013.01); *B25J 15/0675* (2013.01); *B25J 15/0683* (2013.01); *B65G 47/905* (2013.01); *B07C 5/342* (2013.01); *B65G 2203/0208* (2013.01); *B65G 2203/042* (2013.01)

(58) Field of Classification Search
CPC ... B07C 5/368; B25J 15/0675; B25J 15/0683; B65G 47/902; B65G 47/905; B65G 47/525
USPC ............................................. 198/493, 370.11
See application file for complete search history.

(56) References Cited

U.S. PATENT DOCUMENTS

| | | | |
|---|---|---|---|
| 4,732,513 A | 3/1988 | Lenhart | |
| 5,037,245 A | 8/1991 | Smith | |
| 5,209,387 A | 5/1993 | Long | |
| 5,299,693 A * | 4/1994 | Ubaldi | B07C 5/3412 209/3.3 |
| 5,423,431 A * | 6/1995 | Westin | B07C 5/3412 209/539 |
| 5,628,409 A * | 5/1997 | Thomas | B07C 5/126 209/939 |
| 6,124,560 A | 9/2000 | Roos | |

(Continued)

FOREIGN PATENT DOCUMENTS

CA         3071944         3/2019

*Primary Examiner* — James R Bidwell
(74) *Attorney, Agent, or Firm* — Van Pelt, Yi & James LLP

(57) ABSTRACT

Actuating an air conveyor device is disclosed, including: causing an airflow to be generated by an airflow generator of an air conveyor device, wherein the airflow generator is configured to cause the airflow to enter an intake port of the air conveyor device and exit from an outlet port of the air conveyor device in response to receiving air at an air input port of the air conveyor device; causing a target object to be captured by the air conveyor device using the airflow; activating a positioning actuator mechanism to position the air conveyor device; and causing the target object to be ejected from the air conveyor device.

19 Claims, 22 Drawing Sheets

(56) References Cited

U.S. PATENT DOCUMENTS

| | | | |
|---|---|---|---|
| 6,313,422 B1* | 11/2001 | Anibas | B07C 5/367 |
| | | | 209/580 |
| 8,615,123 B2 | 12/2013 | Dabic | |
| 8,892,148 B2* | 11/2014 | Bhaskaran | H04L 65/403 |
| | | | 455/518 |
| 10,207,296 B2 | 2/2019 | Garcia | |
| 10,370,202 B2 | 8/2019 | Hukelmann | |
| 10,625,304 B2 | 4/2020 | Kumar | |
| 10,710,119 B2 | 7/2020 | Kumar | |
| 10,722,922 B2 | 7/2020 | Kumar | |
| 2006/0054774 A1 | 3/2006 | Yassour | |
| 2007/0278139 A1* | 12/2007 | Cowling | B07C 5/36 |
| | | | 209/606 |
| 2009/0272624 A1* | 11/2009 | Edwards | B07C 5/363 |
| | | | 209/552 |
| 2012/0116572 A1 | 5/2012 | Corak | |
| 2012/0319416 A1 | 12/2012 | Ellis | |
| 2013/0168301 A1 | 7/2013 | Dell Endice | |
| 2016/0136816 A1* | 5/2016 | Pistorino | B07C 5/3422 |
| | | | 700/223 |
| 2017/0232479 A1 | 8/2017 | Pietzka | |
| 2018/0186012 A1 | 7/2018 | Regan | |
| 2019/0070734 A1* | 3/2019 | Wertenberger | B25J 15/0616 |
| 2019/0084012 A1 | 3/2019 | Mccoy, Jr. | |
| 2020/0290088 A1 | 9/2020 | Kumar | |
| 2020/0368786 A1 | 11/2020 | Kumar | |
| 2021/0229133 A1 | 7/2021 | Kumar | |
| 2021/0346916 A1 | 11/2021 | Kumar | |
| 2022/0016675 A1 | 1/2022 | Kumar | |
| 2022/0023918 A1 | 1/2022 | Kumar | |

* cited by examiner

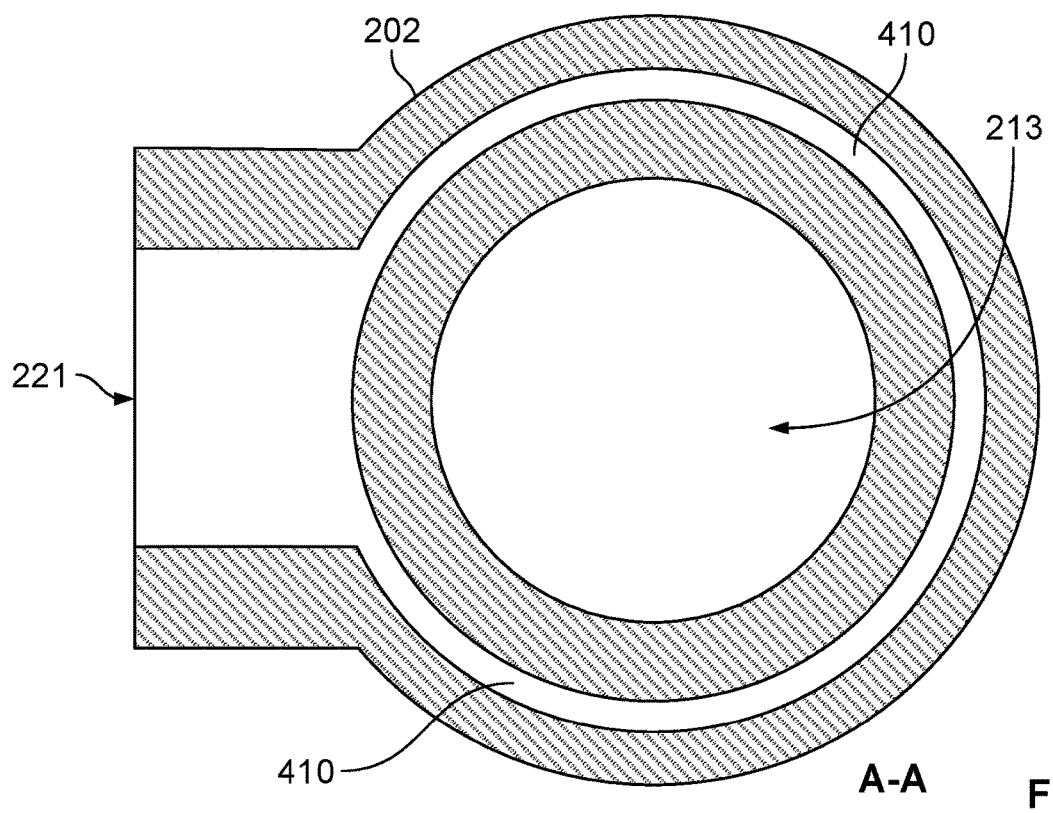
A-A  FIG. 4A
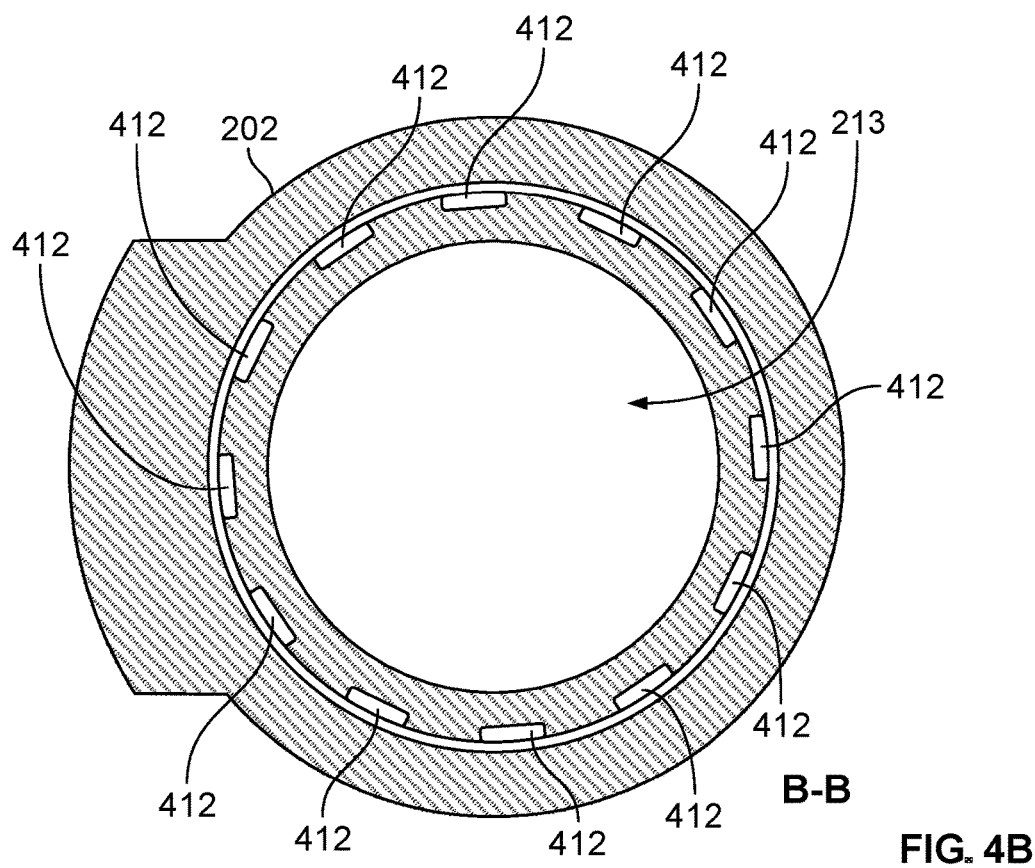
B-B  FIG. 4B

ACTUATED AIR CONVEYOR DEVICE FOR MATERIAL SORTING AND OTHER APPLICATIONS

CROSS REFERENCE TO OTHER APPLICATIONS

This application claims priority to U.S. Provisional Patent Application No. 62/948,404 entitled SYSTEMS AND METHODS FOR AIR CONVEYOR MOTIVATED MATERIAL SORTING filed Dec. 16, 2019 which is incorporated herein by reference for all purposes.

BACKGROUND OF THE INVENTION

Within many industrial facilities, objects are transported on conveyor belts from one location to another. Often a conveyor belt will carry an unsorted mixture of various objects and materials. Within recycling and waste management facilities for example, some of the conveyed objects may be considered desirable (e.g., valuable) materials while others may be considered undesirable contaminants. For example, the random and unsorted contents of a collection truck may be unloaded at the facility onto a conveyor belt. Although sorting personnel may be stationed to manually sort materials as it is transported on the belt, the use of sorting personnel is limiting because they can vary in their speed, accuracy, and efficiency and can suffer from fatigue over the period of a shift. Human sorters also require specific working conditions, compensation, and belt speeds. Production time is lost to training the many new employees that enter as sorters, and operation costs increase as injuries and accidents occur.

For the reasons stated above and for other reasons stated below which will become apparent to those skilled in the art upon reading and understanding the specification, there is a need in the art for airflow motivated material sorting.

BRIEF DESCRIPTION OF THE DRAWINGS

Various embodiments of the invention are disclosed in the following detailed description and the accompanying drawings.

Embodiments of the present disclosure can be more easily understood and further advantages and uses thereof more readily apparent, when considered in view of the description of the preferred embodiments and the following figures in which:

FIGS. 4, 4A, 4B, 4C and 4D are cross-sectional diagrams illustrating an air conveyor device in accordance with some embodiments.

In accordance with common practice, the various described features are not drawn to scale but are drawn to emphasize features relevant to the present disclosure. Reference characters denote like elements throughout figures and text.

DETAILED DESCRIPTION

Figure 1:
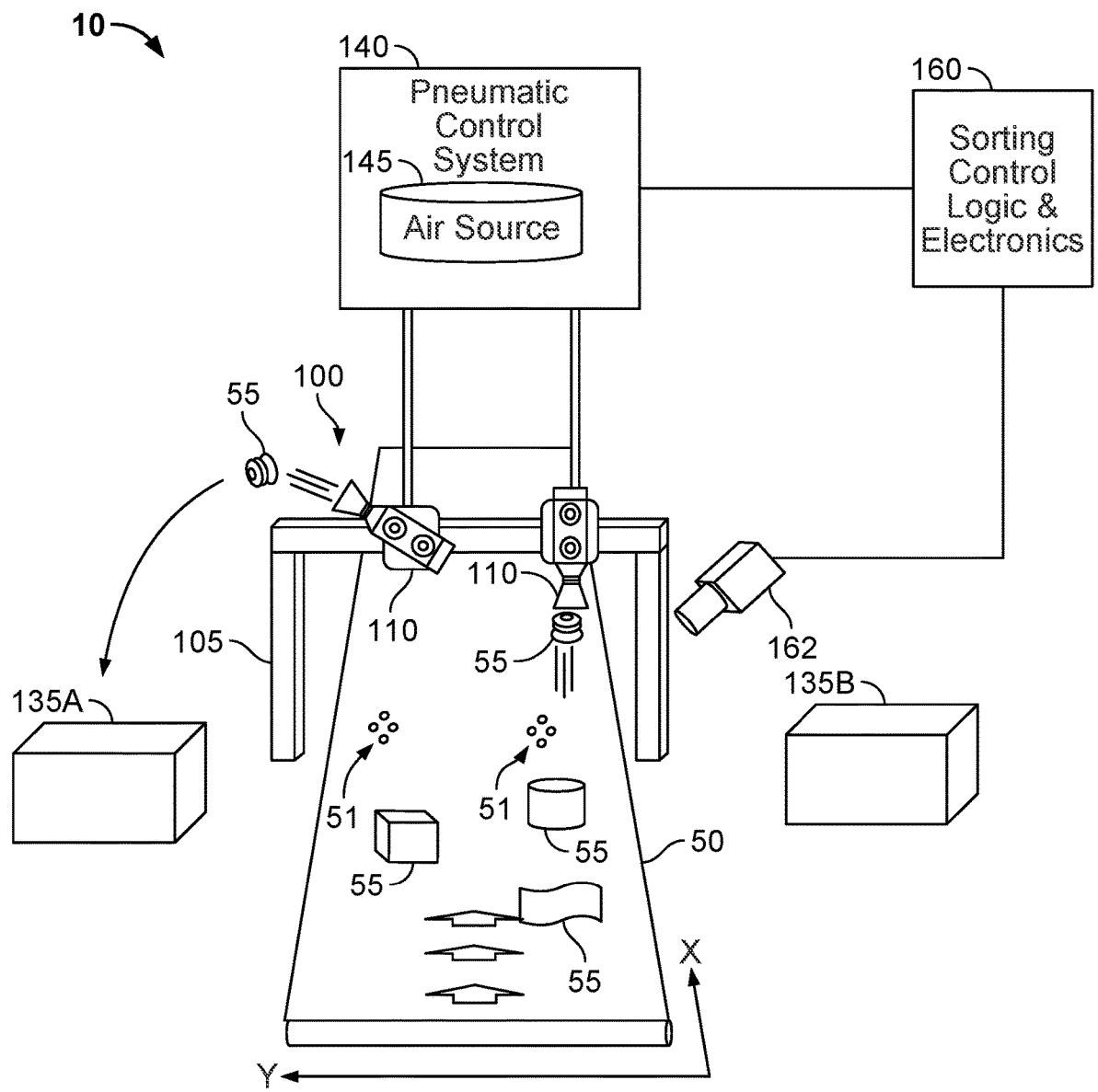
FIG. 1 is a diagram illustrating material sorting system 10 in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical, and electrical changes may be made without departing from the scope of the present disclosure. The following detailed description is, therefore, not to be taken in a limiting sense.

The introduction of sorting systems (such as robotic systems, for example) for sorting materials has led to increased productivity and decreased contamination for Material Recovery Facilities (MRFs). Robots and similar systems have been utilized as a viable replacement, or supplement, for human sorters due to their speed, reliability, and durability. The objective of sorting systems is to recover the specific target material(s) and eject them into bunkers without introducing other materials (contaminants) into the sorted bunkers. A common technique used by these sorting systems to grasp target materials involves the use of a robotically positioned suction gripper. The suction cup gripper can apply a substantial suction force to a targeted object so as to grasp the targeted object from a conveyor belt (for example). Once the object is captured, the robot can then reposition the suction gripper and release the object into a material deposit location by curtailing the suction force.

However, one challenge faced in using robotically positioned suction grippers is the challenge of delivering a negative pressure air supply to the suction gripper in order to enable the gripper to apply a suction force to a targeted object. For example, the routing of vacuum tubing can be complex when used in combination with rapidly moving robotic arms and actuators and leads to reliability issues. Moreover, the rapidly moving robotic arms and actuators can themselves present a hazard to nearby facility workers and involve many moving mechanical parts that can require substantial maintenance. Another problem can occur when an object becomes lodged at the input port or within the housing of the suction gripper, effectively placing the air conveyor out of service and requiring a maintenance technician to manually remove the clog.

Embodiments of an actuated air conveyor device for material sorting are described herein. An airflow is caused to be generated by an airflow generator of an air conveyor device. In some embodiments, an air conveyor device is configured to emit a vacuum/suction airflow to enable the air conveyor device to capture (e.g., pick up) a target object. The airflow generator is configured to cause the airflow to enter an intake port of the air conveyor device and exit from an outlet port of the air conveyor device in response to receiving air at an air input port of the air conveyor device. A target object (e.g., that is being transported by a conveyor belt) is caused to be captured by the air conveyor device using the airflow. A positioning actuator mechanism is activated to position the air conveyor device. In some embodiments, after the target object has been captured (e.g., held onto by the air conveyor device by the vacuum/suction airflow), the position (e.g., comprising the orientation, location, and/or height) of the air conveyor device is adjusted by a positioning actuator mechanism coupled to the air conveyor device to facilitate the ejection of the target object. After the air conveyor device has been positioned, the target object is caused to be ejected from the air conveyor device.

As discussed below, a sorting machine based on an air conveyor device as described herein can quickly and accurately remove materials from a moving conveyor mechanism in an efficient and effective manner. In some embodiments, an external control system and object recognition system may be utilized in combination with one or more air conveyor devices to identify target objects, control material capture operations, and to activate material ejection operations to, for example, release, eject, or ballistically project captured target objects through the air into designated deposit locations.

FIG. 1 is a diagram illustrating material sorting system 10 in accordance with some embodiments. In system 10, material extraction assembly 100 is designed to retrieve objects along the width of moving conveyor mechanism 50, such as a conveyor belt, as depicted in FIG. 1. Material identified for removal from conveyor mechanism 50 by material extraction assembly 100 is referred to herein as "target objects." For example, an object may be identified for removal if it is identified to be of a target material type. Although waste products travelling on a conveyor belt are used as example target objects in the example embodiments described herein, it should be understood that in alternate implementations of these embodiments, the target objects need not be waste materials but may comprise any type of material for which it may be desired to sort and/or segregate. Moreover, although a conveyor belt is used as an example conveyance mechanism for transporting the target objects, it should be understood that in alternate implementations of these embodiments, other conveyance mechanisms may be employed. For example, for any of the embodiments described below, in place of an active conveyance mechanism such as conveyor belt, an alternate conveyance mechanism may comprise a chute, slide, or other passive conveyance mechanism through and/or from which material tumbles, falls, or otherwise is gravity fed as it passes by the imaging device. In some embodiments, conveyor mechanism 50 may include features (shown at 51) that increase airflow available as intake into material extraction assembly 100. For example, holes, cleats, treads, or other raised or recessed surface features in, or on, conveyor mechanism 50 may be included in various alternative implementations.

In the example shown in FIG. 1, material extraction assembly 100 comprises one or more instances of air conveyor device 110. In various different embodiments, one or more instances of air conveyor device 110 may be mounted to static mounting structure 105 (such as a mounting frame) and/or to a dynamically movable structure such as an actuator, robot, or other form of positioner. As further discussed in detail below, each instance of air conveyor device 110 is controlled to capture a target object (shown at 55) from conveyor mechanism 50, and then to eject target object 55 into a designated deposit location (for example, a receptacle such as shown at 135A and 135B) for target object 55. It should be understood that in some embodiments, different classes (e.g., material types) of target objects 55 may have different designated deposit locations such that one class (e.g., material type) of target object 55 is jettisoned into receptacle 135A and another into receptacle 135B.

In the example shown in FIG. 1, material sorting system 10 further comprises at least one object recognition device 162, which is utilized to capture information about objects on conveyor mechanism 50 in order to discern target objects 55 from non-target objects. In some embodiments, conveyor mechanism 50 is configured to transport material into a field of view of object recognition device 162 and towards one or more instances of air conveyor device 110. Object recognition device 162 may comprise an image capturing device (such as, for example, an infrared camera, visual spectrum camera, non-visible electromagnetic radiation sensor, volumetric sensor, or some combination thereof) directed at conveyor mechanism 50. However, it should be understood that an image capturing device for object recognition device 162 is presented as an example implementation. In other embodiments, object recognition device 162 may comprise any other type of sensor that can detect and/or measure characteristics of objects on conveyor mechanism 50. For example, object recognition device 162 may utilize any form of a sensor technology for detecting non-visible electromagnetic radiation (such as a hyperspectral camera, infrared, or ultraviolet), such as a magnetic sensor; a capacitive sensor; or other sensors commonly used in the field of industrial automation. As such, the signal that is delivered to sorting control logic and electronics 160 from object recognition device 162 may comprise, but is not necessarily, a visual image signal. In the example shown in FIG. 1, object recognition device 162 produces a signal that is delivered to sorting control logic and electronics 160 and which may be used by sorting control logic and electronics 160 to send airflow control signals to pneumatic control system 140 that delivers pressurized air to one or more instances of air conveyor device 110 in order to initiate material capture and ejection actions on target objects.

Figure 1A:
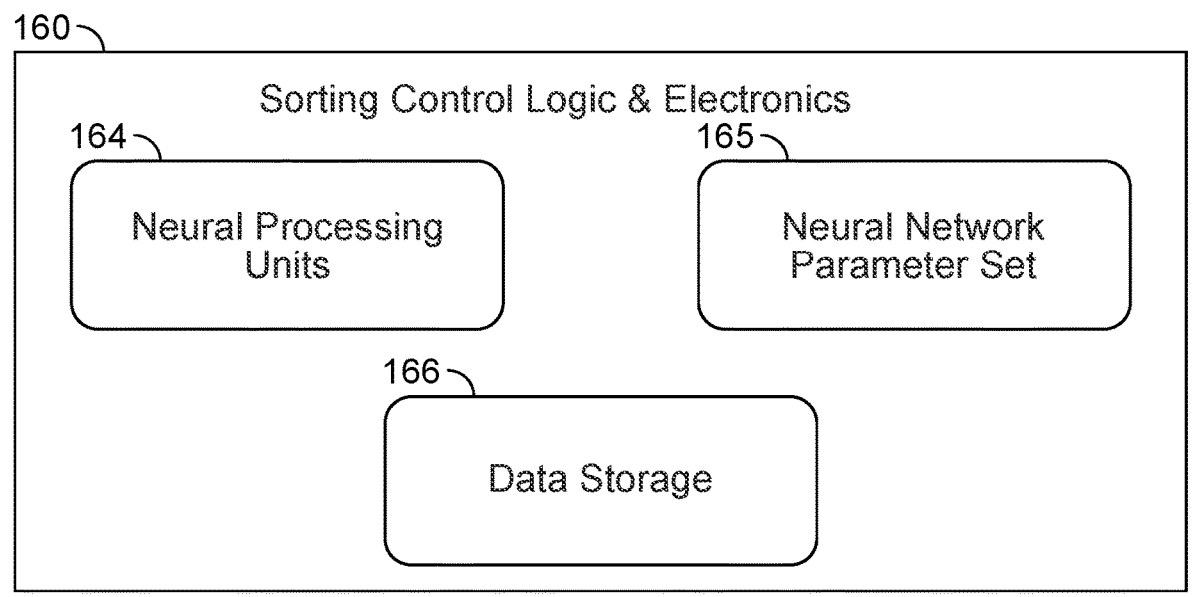
FIG. 1A is a diagram illustrating an example sorting control logic and electronics in accordance with some embodiments.

As shown in FIG. 1A, in some embodiments, sorting control logic and electronics 160 comprises one or more neural processing units 164, neural network parameter set 165 (which stores learned parameters utilized by neural processing units 164), and data storage 166 that stores, for example, object data received from object recognition device 162, processed object data comprising labeled data, and/or may further be used to store other data such as material characterization data generated by neural processing units 164. Neural network parameter set 165 and data storage 166 may either be implemented together on a common physical non-transient memory device, or on separate physical non-transient memory devices. In some embodiments, data storage 166 may comprise a removable storage media. In various embodiments, sorting control logic and electronics 160 may be implemented using a microprocessor coupled to a memory that is programmed to execute code to carry out the functions of sorting control logic and electronics 160 described herein. In other embodiments, sorting control logic and electronics 160 may additionally, or alternately, be implemented using an application specific integrated circuit (ASIC) or field programmable gate array (FPGA) that has been adapted for machine learning or cloud-based computing. In operation, in some embodiments, object recognition device 162 is directed towards conveyor mechanism 50 in order to capture object information from an overhead view of the materials being transported by conveyor mechanism 50. Object recognition device 162 produces a signal that is delivered to sorting control logic and electronics 160.

In some embodiments, within sorting control logic and electronics 160, raw object data (which in the case of camera sensor may comprise image frames, for example) is provided as input to one or more neural network and artificial intelligence computer programs of neural processing units 164 to locate and identify material appearing within the image frames that are potentially target object 55. In various embodiments, an "image frame" is intended to refer to a collection or collected set of object data captured by object recognition device 162 that may be used to capture the spatial context of one or more potential target objects on conveyor mechanism 50 along with characteristics about the objects themselves. A feed of image frames captured by object recognition device 162 is fed, for example, to a machine learning inference computer program implemented by neural processing units 164. The sequence of captured image frames may be processed by multiple processing layers, or neurons, of the neural processing units 164 to evaluate the correlation of specific features with features of objects that it has previously learned. Alternative computer programs to detect objects within an image include Fully Convolutional Neural Network, Multibox, Region-based Fully Convolutional Networks (R-FCN), Faster R-CNN, and other techniques commonly known to those skilled in the art as object detection, instance-aware segmentation, or semantic segmentation computer programs described in available literature.

Based on the input raw object data (e.g., image frames) that is provided by object recognition device 162, sorting control logic and electronics 160 is configured to determine information related to target objects that are being transported by conveyor mechanism 50. In some embodiments, the information related to target objects that are determined by sorting control logic and electronics 160 includes attribute information. For example, attribute information includes one or more of, but not limited to, the following: a material type associated with each target object, an approximate mass associated with each target object, an approximate weight associated with each target object, an associated geometry associated with each target object, dimensions (e.g., height and width/area) associated with each target object, a designated deposit location associated with each target object, and an orientation associated with each target object. In some embodiments, the information related to target objects that are determined by sorting control logic and electronics 160 includes location information. For example, location information includes one or more coordinates (e.g., along the X and Y axes as shown in FIG. 1) at which each target object was located in the image frame(s) that were input into sorting control logic and electronics 160. In a specific example, the location information of each target object is the coordinate of the centroid of the target object.

Using the attribute information and/or location information associated with each target object, sorting control logic and electronics 160 is configured to select a target object, from conveyor mechanism 50, on which to perform a capture action. In various embodiments, performing a "capture action" on a target object comprises using air conveyor device 110 to emit a vacuum force/airflow that will pull a target object toward the air conveyor device 110 and off of conveyor mechanism 50. In some embodiments, which target object is selected for air conveyor device 110 to capture next is determined as a function of one or more, but not limited to the following: the current location of air conveyor device 110, the current location of the target object, the deposit location corresponding to the target object, the speed of conveyor mechanism 50, an approximated (e.g., resale) value of the target object, and the current angle of air conveyor device 110. In some embodiments, sorting control logic and electronics 160 is configured to select a target object to capture based on the attribute information associated with the target object and/or the location information associated with the target object. In a first example, a target object is selected to be captured because its current location on conveyor mechanism 50 is close to the current location of air conveyor device 110, which means air conveyor device 110 can reach the target object without being repositioned. In a second example, a target object is selected because, based on its material type, dimensions (e.g., area), and/or mass, the target object is determined to be of a higher (e.g., resale) value. In a third example, a target object is selected because its current location is close to the location of its corresponding deposit location (e.g., the corresponding deposit location is determined based on the material type associated with the target object). In a fourth example, a target object is selected because its current location aligns with the current angle at which air conveyor device 110 is positioned, which means that air conveyor device 110 can reach the target object without being repositioned.

After the target object to capture has been selected, sorting control logic and electronics 160 is configured to send a position control signal to air conveyor device 110 that is to capture the target object. The position control signal is configured to cause a positioning actuator mechanism that is coupled to air conveyor device 110 to reposition air conveyor device 110, if appropriate, to better accommodate a capture of the target object. Examples of a positioning actuator mechanism include a rotator actuator, a linear positioning mechanism, a moveable carrier, a robot, or a combination thereof. Specific examples of a positioning actuator mechanism are described further below. In various embodiments, the position control signal is configured to cause the positioning actuator mechanism to rotate air conveyor device 110, laterally move air conveyor device 110 across conveyor mechanism 50 (e.g., across the X-axis and/or Y-axis), and/or move air conveyor device 110 closer to or further away from the surface of conveyor mechanism 50 so as to better align the position/location of air conveyor device 110 with the location of the target object. In response to receiving the position control signal, the positioning actuator mechanism is activated to perform the positioning of air conveyor device 110 in accordance with the parameters included in the position control signal. For example, the position control signal includes parameters such as a desired angle at which to rotate air conveyor device 110, a destination coordinate to which air conveyor device 110 is to be moved, and/or a desired height over the surface of conveyor mechanism 50 to which air conveyor device 110 is to be moved.

After or concurrent with sorting control logic and electronics 160 sending the position control signal, sorting control logic and electronics 160 is configured to send an airflow control signal to pneumatic control system 140. In response to the airflow control signal, pneumatic control system 140 is configured to cause air conveyor device 110 to perform the capture action on the corresponding target object. The airflow control signal is configured to instruct pneumatic control system 140 to supply an airflow to a respective air input port of air conveyor device 110, as will be described in further detail below, where a corresponding airflow generator within air conveyor device 110 is configured to direct the airflow into a vacuum airflow/force that flows from the intake port to the outlet port of air conveyor device 110. The vacuum airflow that flows through each instance of air conveyor device 110 will therefore enable a capture action to be performed by air conveyor device 110 by drawing the target object off of conveyor mechanism 50 and towards air conveyor device 110. In some embodiments, the airflow control signal sent by sorting control logic and electronics 160 is a variable control signal that includes a parameter that dictates the pressure of the airflow to be supplied by pneumatic control system 140. The variable control signal will determine the pressure of pneumatic airflow and therefore, the amount of vacuum force that will be applied to the target object. In some embodiments, sorting control logic and electronics 160 is configured to instruct a static/fixed pressure for airflow (and therefore, static vacuum force) for each capture action. In some embodiments, sorting control logic and electronics 160 is configured to dynamically determine a pressure for airflow for each capture action. For example, the pressure of pneumatic airflow can be dynamically determined based at least in part on the weight or mass of the target object, the size of the target object, the material type of the target object, and the speed of conveyor mechanism 50. If a capture action is successful, a target object is picked up off conveyor mechanism 50 by air conveyor device 110. In some embodiments, a successful capture action can be determined by detecting a change (e.g., matching a predetermined signature) in pressure within air conveyor device 110 (e.g., as detected by a material obstruction sensor associated with air conveyor device 110), the motor associated with positioning actuator mechanism 206 (e.g., a robot), and/or in a current that is drawn by positioning actuator mechanism 206.

Figure 2:
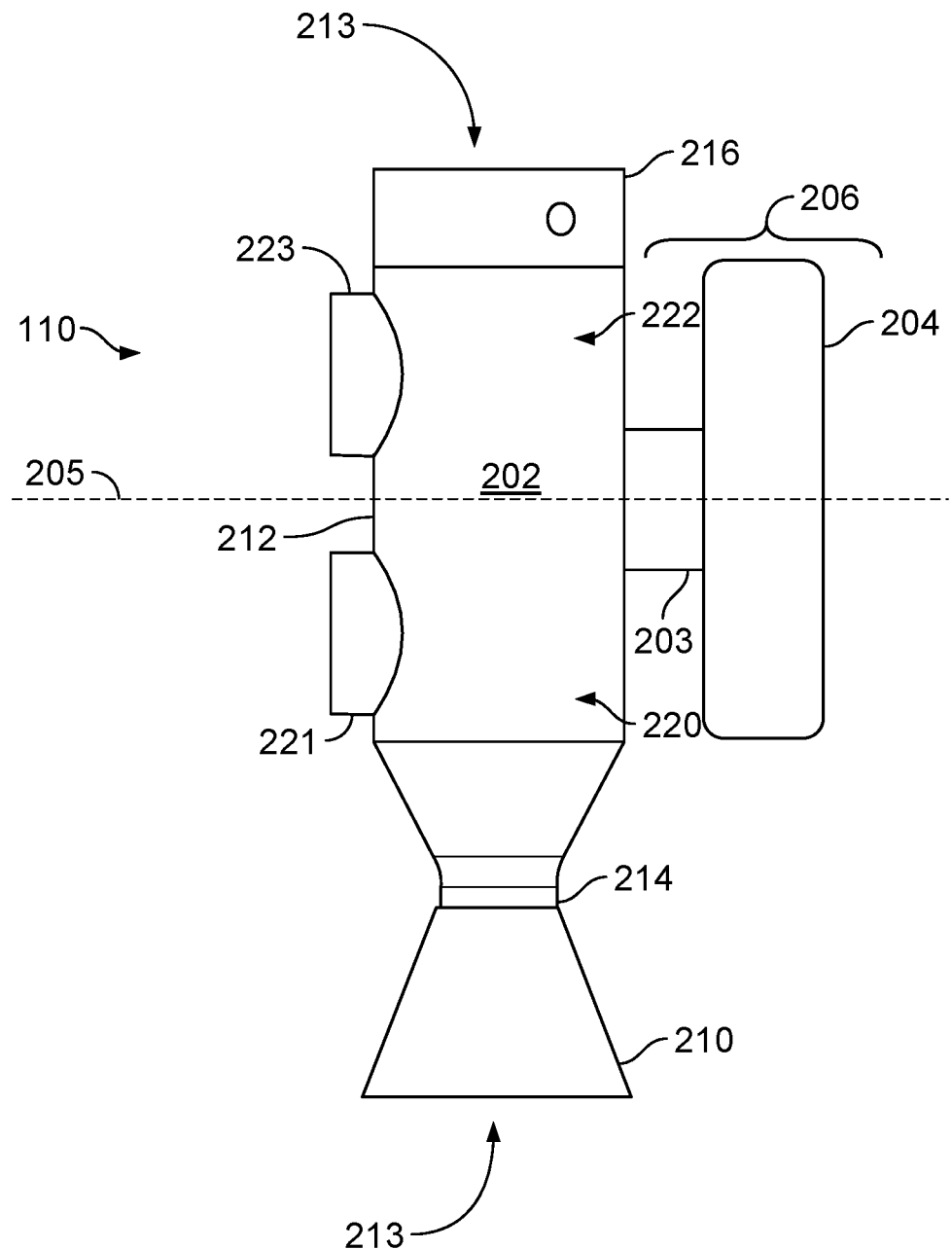
FIG. 2 is a diagram illustrating an example air conveyor device in accordance with some embodiments.
Figure 2A:
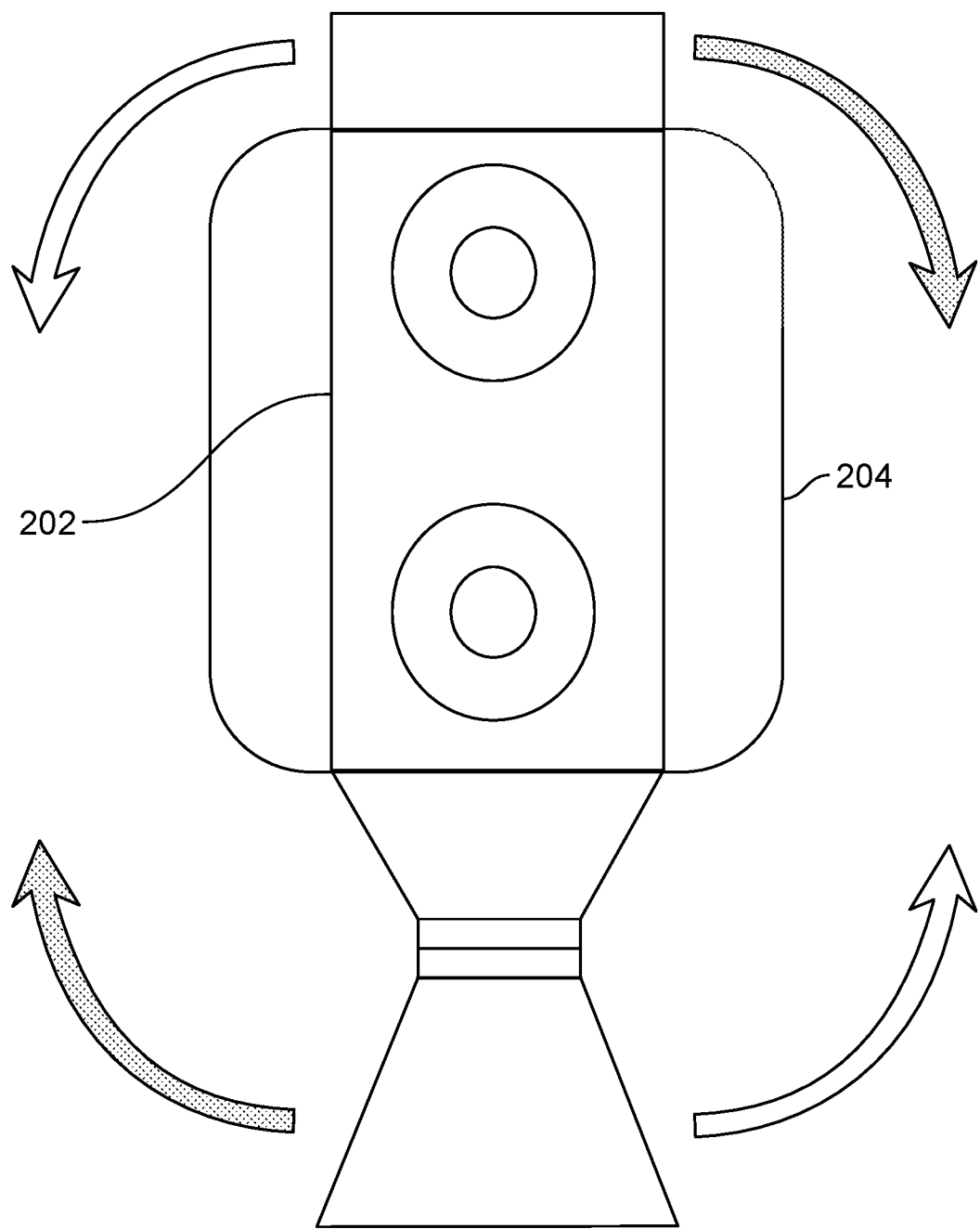
FIGS. 2A-2C are diagrams illustrating the operation of an example air conveyor device in accordance with some embodiments.
Figure 2B:
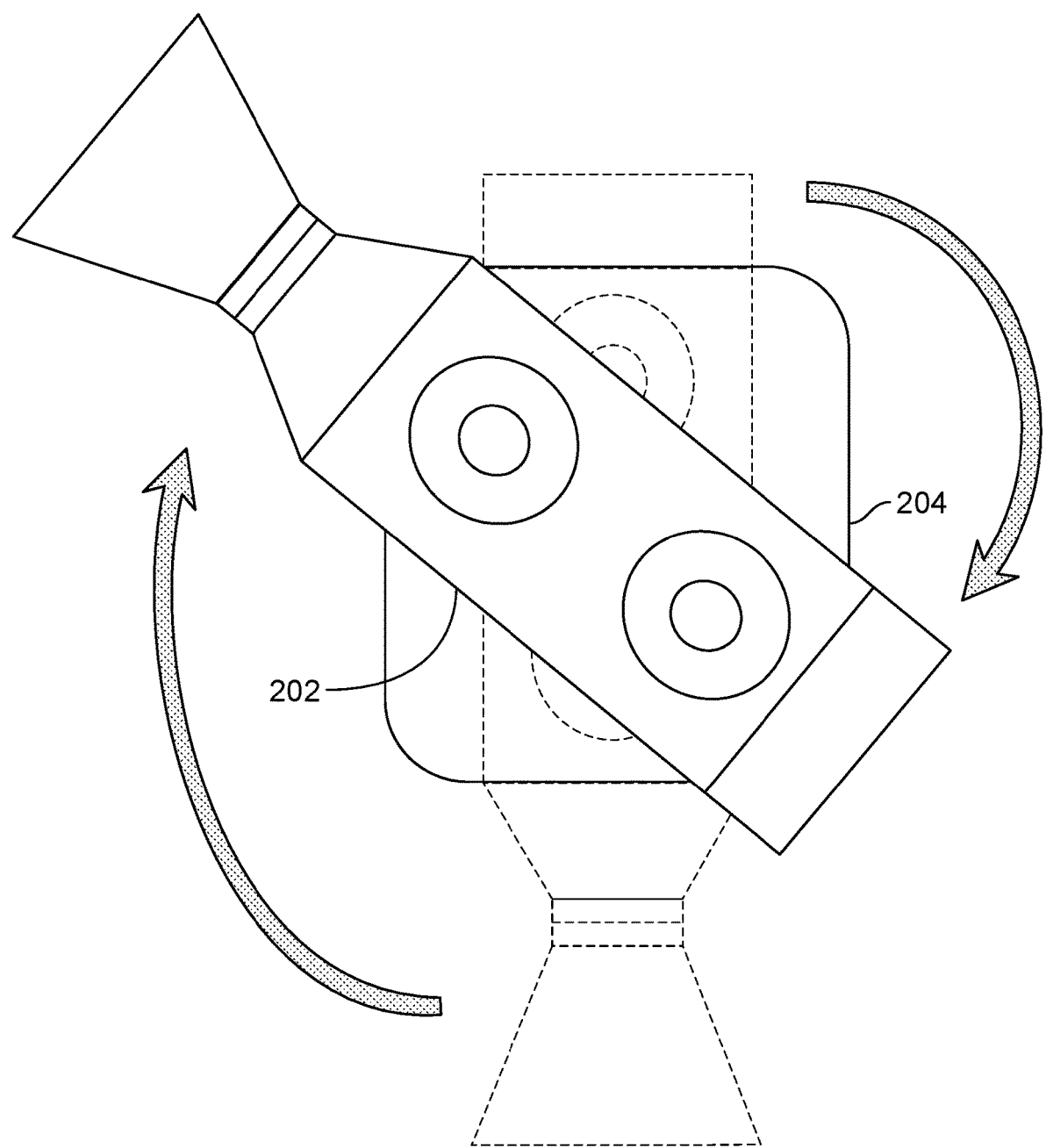
Figure 2C:
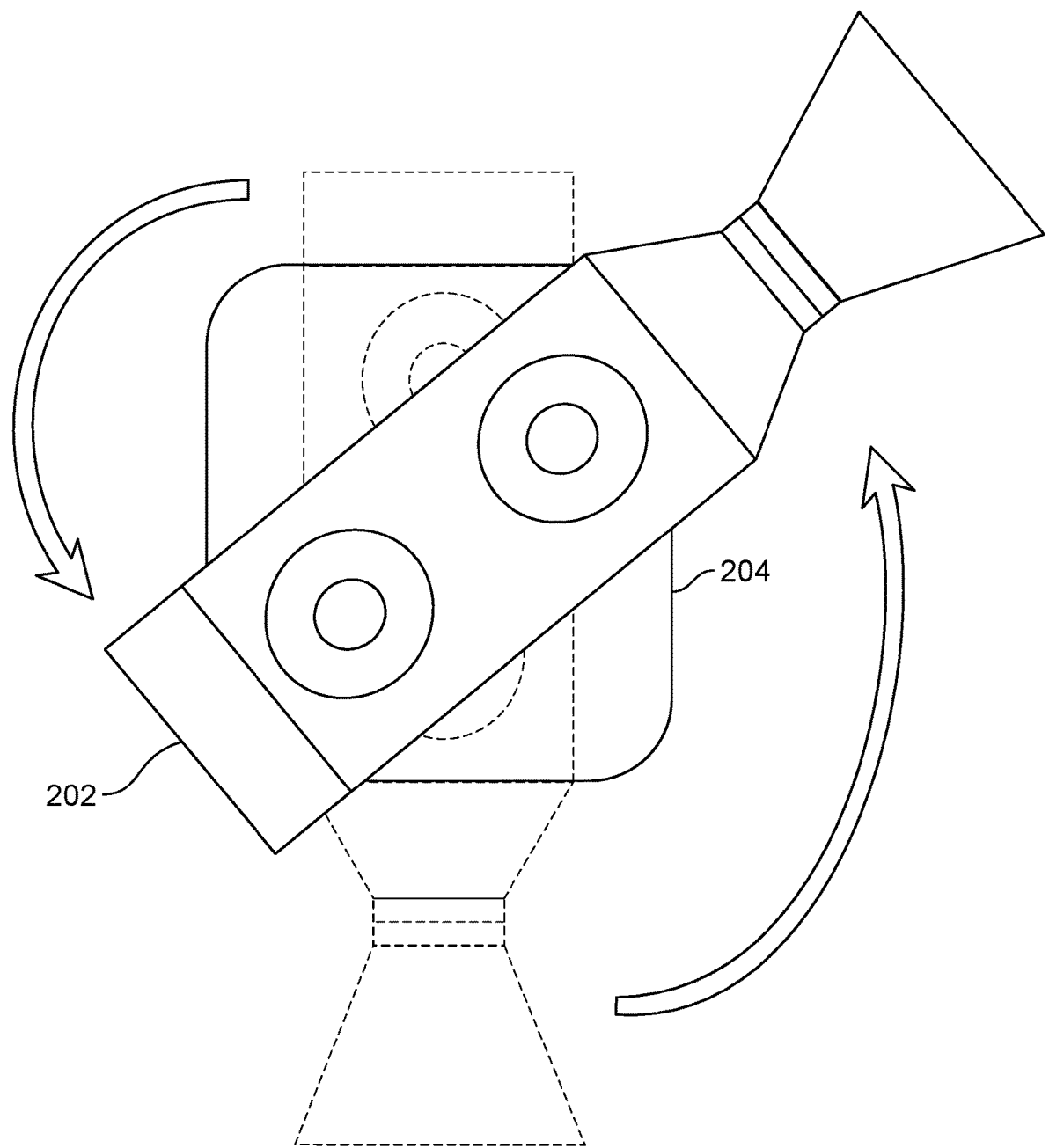

FIG. 2 is a diagram illustrating an example air conveyor device in accordance with some embodiments. The example conveyor gripper device shown in FIG. 2 comprises bidirectional air conveyor device 202 coupled to positioning actuator mechanism 206. In some embodiments, air conveyor device 110 of FIG. 1 may be implemented using bidirectional air conveyor device 202 of FIG. 2. In the particular example shown in FIG. 2, positioning actuator mechanism 206 comprises rotator actuator 204 and bidirectional air conveyor 202 is coupled to positioning shaft 203 of rotator actuator 204. Rotator actuator 204 is configured to respond to position control signals from sorting control logic and electronics 160 to rotate positioning shaft 203 in order to pivot bidirectional air conveyor device 202 about an axis of rotation 205 (as illustrated in FIGS. 2A-2C). In some embodiments, axis of rotation 205 may be parallel to the plane of the conveyor mechanism so that bidirectional air conveyor device 202 can apply a suction force to target objects 55 at an angle normal to the plane of the conveyor mechanism.

In alternate embodiments, rotator actuator 204 may comprise a servo, step motor, pneumatic positioner, or other known electrical or mechanical device which can be operated by sorting control logic and electronics 160 to rotate bidirectional air conveyor device 202 to a desired position. For example, FIG. 2A illustrates one implementation where rotator actuator 204 has rotated bidirectional air conveyor device 202 to an initial position in which bidirectional air conveyor device 202 can execute a capture action to retrieve target object 55 from conveyor mechanism 50. FIG. 2B illustrates rotator actuator 204 responding to a position control signal from sorting control logic and electronics 160 to rotate bidirectional air conveyor device 202 in a clockwise direction to a first position. FIG. 2C illustrates rotator actuator 204 responding to a position control signal from sorting control logic and electronics 160 to rotate bidirectional air conveyor device 202 in a counter-clockwise direction to a second position. It should be understood that in some embodiments, rotator actuator 204 may be configured to rotate bidirectional air conveyor device 202 in any one of a plurality of different positions in either the clockwise or counter-clockwise position as directed by sorting control logic and electronics 160. One or more of these positions where bidirectional air conveyor device 202 is rotated away from the initial position may be defined as object ejection positions from which bidirectional air conveyor device 202 may reverse its airflow (and/or apply a mechanical force as discussed below) to project captured object 55 to receptacle 135, as will be described in further detail below. In some embodiments, rotator actuator 204 may also be controlled by sorting control logic and electronics 160 to rotate bidirectional air conveyor device 202 away from the initial position in order to better align the vacuum force to capture target object 55.

Figure 2D:
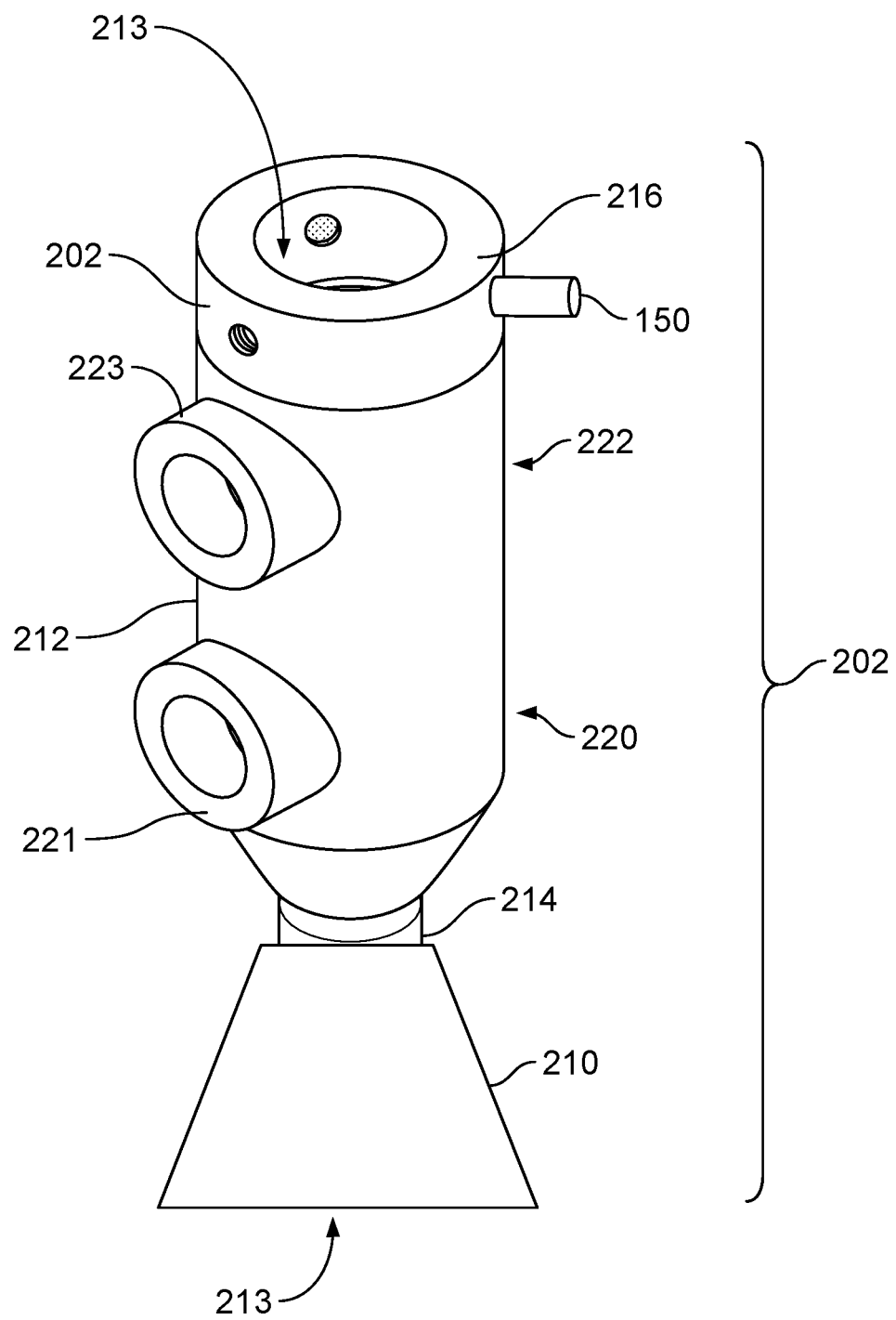
FIG. 2D is a diagram of an example bidirectional air conveyor device in accordance with some embodiments.

In some embodiments, as shown in FIGS. 2 and 2D, bidirectional air conveyor device 202 comprises housing 212 that includes internal through-passageway 213 that connects intake port (or aperture) 214 of housing 212 to outlet port (or aperture) 216 of housing 212. Bidirectional air conveyor device 202 may selectively generate a negative pressure airflow through internal through-passageway 213 in from intake port 214 to outlet port 216, or a positive pressure airflow through the through-passageway 213 in from outlet port 216 and out from intake port 214. In some embodiments, bidirectional air conveyor device 202 can be augmented with attachments 210, such as but not limited to a converging cone or funnel directing the airflow drawn by bidirectional air conveyor device 202 over a specific area, assisting in guiding the material into the vacuum produced by bidirectional air conveyor device 202, and/or assisting in gripping onto the material that has been vacuumed towards bidirectional air conveyor device 202.

In some embodiments, bidirectional air conveyor device 202 comprises at least a pair of airflow generators (shown at 220 and 222 and in greater detail in FIG. 4, which is further described below). First airflow generator 220, which may be referred to herein as object capture airflow generator 220, generates the negative pressure airflow intake (i.e., a suction air flow) at intake port 214 of bidirectional air conveyor device 202. This airflow intake results in a force of airflow (i.e., a vacuum or negative pressure force) into intake port 214 that extracts target object 55 from the conveyor mechanism and holds (e.g., grips) it at intake port 214. Second airflow generator 222, which may be referred to herein as object ejection airflow generator 222, generates positive pressure airflow (that is, an outflow or an ejection force) at intake port 214 of bidirectional air conveyor device 202. This positive pressure airflow flows through internal through-passageway 213 and out from intake port 214 to eject captured objects from intake port 214.

In some embodiments, each of first and second airflow generators 220, 222 may incorporate the structure of a Venturi and/or Coanda-based technology, or similar technology, to generate their respective airflows. That is, the motive forces that create the airflows through bidirectional air conveyor device 202 are the result of a flow of compressed air streams supplied by air source 145 (for example, a compressed or pressurized air source) of pneumatic control system 140. As further discussed in detail below, coupling pressurized air input port 221 of first airflow generator 220 to air source 145 will activate first airflow generator 220 to generate the airflow into intake port 214. Coupling pressurized air input port 223 of the second airflow generator 222 to pressurized air source 145 will activate the second airflow generator 222 to generate the airflow out of intake port 214.

Figure 3:
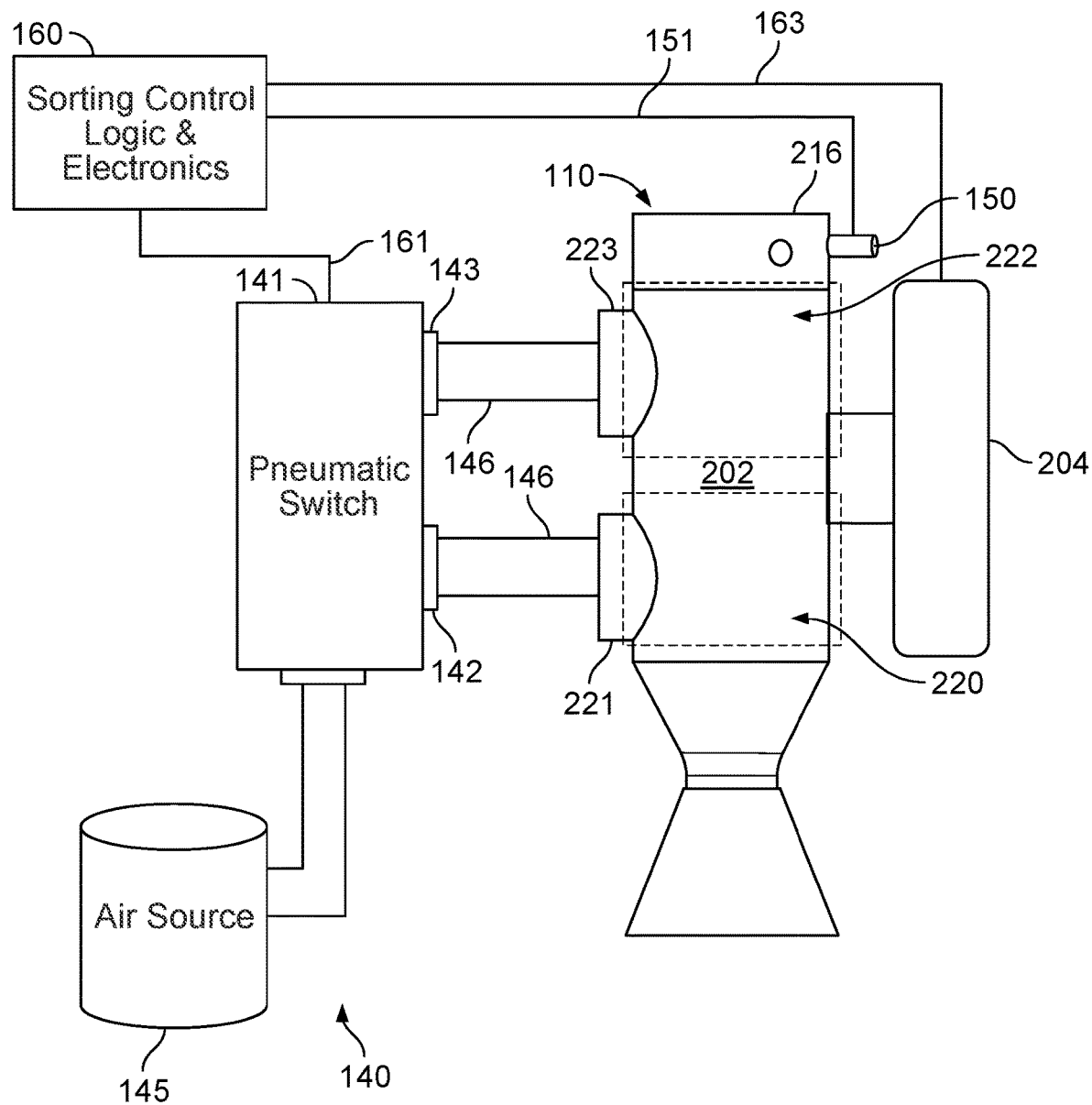
FIG. 3 illustrates an example that shows an example pneumatic control system in accordance with some embodiments.

FIG. 3 illustrates an example that shows an example pneumatic control system in accordance with some embodiments. In some embodiments, pneumatic control system 140 of FIG. 1 may be implemented using the example interconnections to portions of a bidirectional air conveyor device that are shown in FIG. 3. In the example of FIG. 3, the pneumatic control system comprises pneumatic switch 141 and pneumatic switch 141 is coupled to first and second airflow generators 220, 222 of a bidirectional air conveyor device (e.g., such as bidirectional air conveyor device 202 of FIG. 2). Furthermore, pneumatic switch 141 is also coupled to air source 145. Pneumatic switch 141 is configured to provide an air supply for selectively operating and controlling both airflow generators 220 and 222 of bidirectional air conveyor device 202. In alternate implementations, air source 145 may comprise a blower, an air compressor, a compressed air storage tank, or some combination thereof. Although this disclosure may refer to "air" with regards to "airflow," "air compressor," and other elements, it should be understood that the term "air" is used in a generic sense to refer to any compressible gas or mixture of gasses. It should also be understood that the terms "pressurized air" and "compressed air" are used herein synonymously and generally used to refer to air having a pressure that is greater than atmospheric pressure as would be understood by one of ordinary skilled in the art.

In the example of FIG. 3, pneumatic switch 141 is coupled to air source 145. Pneumatic switch 141 is also coupled to sorting control logic and electronics 160 from which it receives airflow control signal 161. In response to airflow control signal 161, pneumatic switch 141 may direct pressurized air to either pressurized air input port 221 of first airflow generator 220, pressurized air input port 223 of second airflow generator 222, or may close the supply of pressurized air to both ports 221, 223. In one embodiment, rotator actuator 204 is coupled to sorting control logic and electronics 160 from which it receives position control signal 163. Airflow control signal 161 and position control signal 163 may be coordinated by sorting control logic and electronics 160 in order to execute object capture and ejection actions. In other words, sorting control logic and electronics 160 rotates bidirectional air conveyor device 202 into a desired position by controlling rotator actuator 204 using position control signal 163. For example, sorting control logic and electronics 160 is configured to determine one or more parameters of position control signal 163 based on the location of designated deposit location 135, the estimated weight of target object 55, and/or the shape of target object 55. After bidirectional air conveyor device 202 is actuated into the desired position, sorting control logic and electronics 160 may then activate either first airflow generator 220 (to capture an object) or second airflow generator 222 (to eject an object) as desired via airflow control signal 161. In some embodiments, airflow control signal 161 may further control the force of the generated airflow, for example based on the estimated weight of target object 55, the distance that target object 55 must travel to reach designated deposit location 135, and/or based on the current position of bidirectional air conveyor device 202.

Figure 3A:
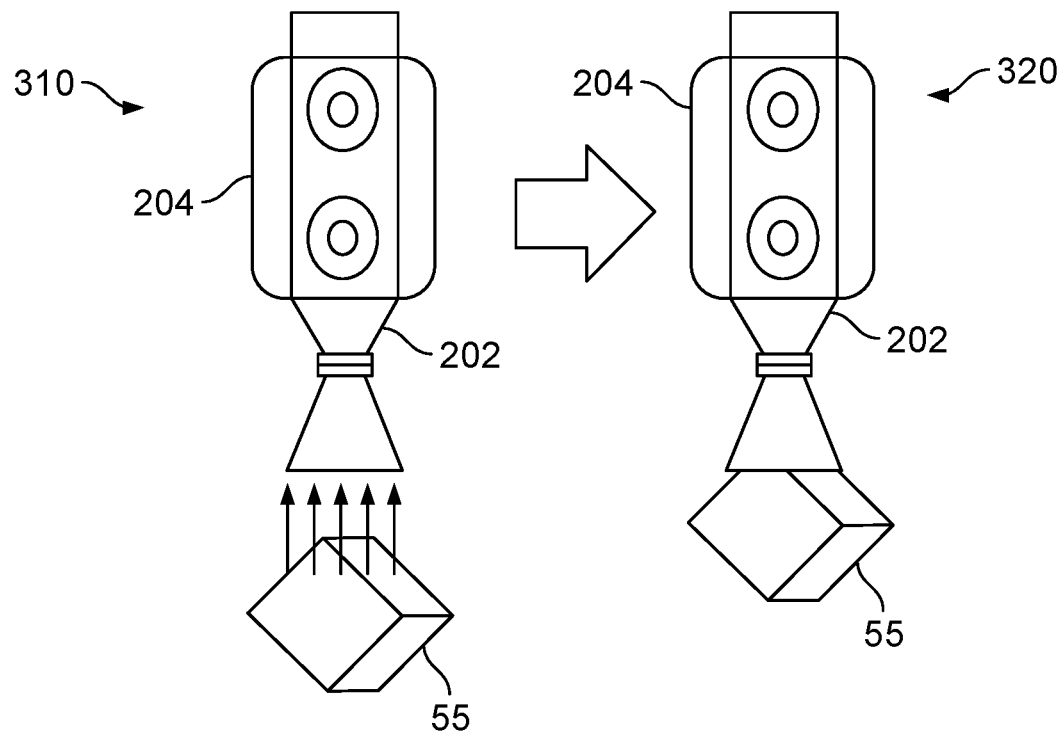
FIGS. 3A and 3B are diagrams illustrating operation of an example air conveyor device in accordance with some embodiments.

For example, in one embodiment in operation, when object recognition device 162 identifies target object 55 to remove from conveyor mechanism 50, a first airflow control signal is sent by sorting control logic and electronics 160 to pneumatic switch 141 to activate the supply of compressed air to first pressurized air input port 221 to activate object capture airflow generator 220. This capture action is illustrated in FIG. 3A, where the lifting of target object 55 by bidirectional air conveyor device 202 is shown at 310 and the holding of the captured target object 55 by bidirectional air conveyor device 202 is shown at 320. The timing of the airflow control signal sent by sorting control logic and electronics 160 is controlled so that the activation of object capture airflow generator 220 occurs at a point in time where target object 55 has reached the proximity of bidirectional air conveyor device 202 such that the vacuum force of object capture airflow generator 220 is effectively strong enough to capture target object 55. For example, where target object 55 has reached the proximity of bidirectional air conveyor device 202 includes the current location of target object 55 being within a predetermined distance within the location of bidirectional air conveyor device 202 and/or bidirectional air conveyor device 202 having been moved to a predicted location of target object 55. In some embodiments, bidirectional air conveyor device 202 may be moved based on position control signal 163 from an initial/current position to a desired position prior to activating object capture airflow generator 220, for example, to facilitate a better alignment of the respective positions of target object 55 and bidirectional air conveyor device 202 (e.g., when target object 55 may not pass directly under object capture airflow generator 220).

Once target object 55 is captured by bidirectional air conveyor device 202, bidirectional air conveyor device 202 is operated to pitch, punt, launch, or deposit target object 55 through the air to a material deposit location (shown at 135). Although this disclosure may refer generally to receptacle 135 as a deposit location, the material deposit location may comprise any form of a holding bin, tank, bunker or other receptacle, conveyor mechanism or shoot where extracted objects can be deposited. The particular destination for objects removed from the conveyor mechanism may depend upon whether they are contaminants or desired materials, and if so, the material type of the objects. In some embodiments, receptacle 135 may comprise a cargo area of a truck or other vehicle so that removed objects 55 are directly loaded onto the vehicle for transport. In other embodiments, receptacle 135 may comprise another conveyor mechanism to transport the removed objects to another location in the facility.

Figure 3B:
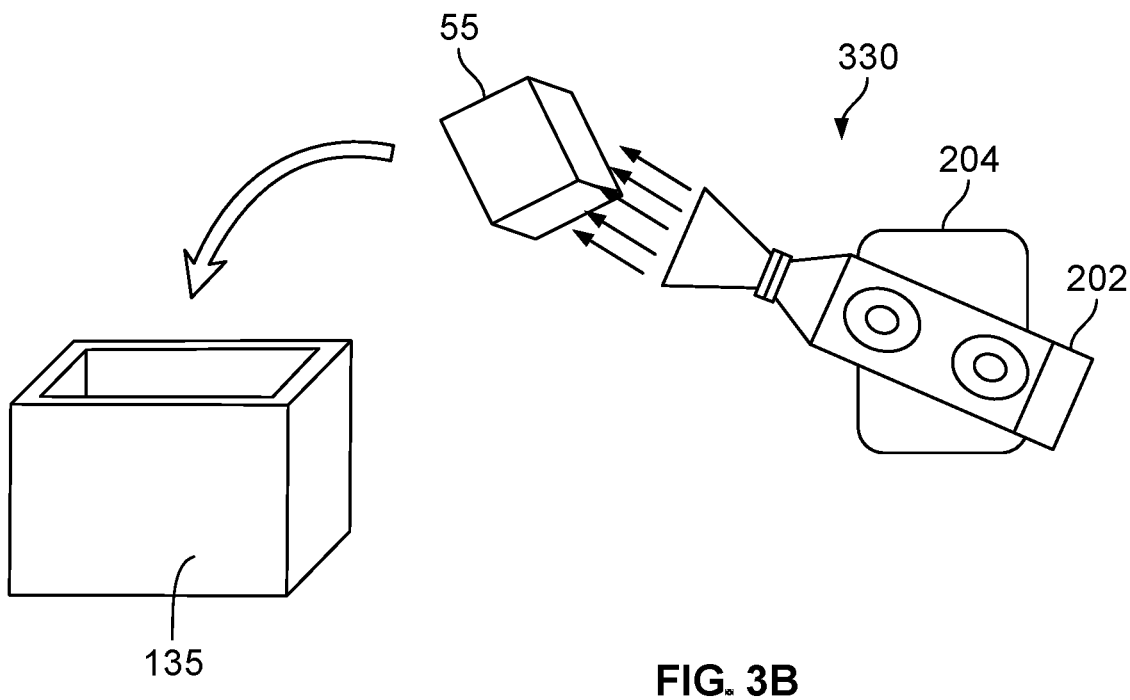

An example material ejection action is illustrated in FIG. 3B where the ejection of target object 55 by bidirectional air conveyor device 202 into receptacle 135 is shown at 330. As illustrated in FIG. 3B, the ejection action involves the rotation of bidirectional air conveyor device 202 to a specified angle (the "desired position") and the initiation of reversal of the airflow through bidirectional air conveyor device 202 to produce a positive pressure airflow of a specified force, that releases/ejects target object 55 and launches it through the air into receptacle 135. For example, receptacle 135 is designated to collect objects of target object 55's material type.

In some embodiments, bidirectional air conveyor device 202 may be configured to eject a captured object from a single (e.g., fixed/static) predetermined ejection position. In that case, rotator actuator 204 responds to position control signal 163 to rotate bidirectional air conveyor device 202 to the fixed/static predetermined ejection position for launching the captured object. Such might be the case where bidirectional air conveyor device 202 is intended to operate to eject all captured objects to a single material deposit location (e.g., such as a single receptacle that is designated to receive all captured objects from that particular bidirectional air conveyor device 202). In such an implementation, object ejection airflow generator 222 may be configured to deliver an airflow burst having a pre-calibrated force such that the angle of bidirectional air conveyor device 202 and force of the ejection airflow will eject target object 55 at a ballistic trajectory that delivers target object 55 to the corresponding material deposit location. The calculations for determination of what force and angle are necessary for a given target object are within the skill of the art to one who has reviewed this disclosure, and are therefore not detailed herein.

In some embodiments, bidirectional air conveyor device 202 may be configured to eject a capture object from a dynamically determined ejection position. In that case, rotator actuator 204 responds to position control signal 163 to rotate bidirectional air conveyor device 202 to the dynamically determined ejection position for launching the captured object. Such might be the case where bidirectional air conveyor device 202 is intended to operate to eject captured objects to multiple material deposit locations or is intended to operate to eject captured objects of different physical attributes (e.g., material types, weight, shapes). For example, bidirectional air conveyor device 202 is designated to capture target objects of different material types and a target object of each different material type is to be deposited into its corresponding deposit location for that particular material type and where deposit locations for different material types may be different. In such an implementation, object ejection airflow generator 222 may be configured to deliver an airflow burst having a dynamically determined force such that the angle of bidirectional air conveyor device 202 and force of the ejection airflow will eject each particular target object 55 at a ballistic trajectory that delivers that particular target object 55 to its particular corresponding material deposit location. The calculations for determination of what force and angle are necessary for a given target object are within the skill of the art to one who has reviewed this disclosure, and are therefore not detailed herein.

In some embodiments, sorting control logic and electronics 160 may variably control the force of the ejection airflow, for example to account for the estimated weight, aerodynamics, or other characteristics of target object 55. Sorting control logic and electronics 160 may evaluate the material characterization data for target object 55 that is generated by neural processing units 164, and based on that material characterization data, select the force of the ejection airflow to be applied to target object 55. For example, based on the material characterization data, sorting control logic and electronics 160 may identify a first captured object as being an aluminum can, and then select a first pre-determined ejection airflow setting (for example, from a table in memory) calibrated to deliver aluminum cans to their corresponding material deposit location. Similarly, based on the material characterization data, sorting control logic and electronics 160 may identify a second captured object as being a half-gallon milk carton, and then select a second predetermined ejection airflow setting (for example, from the table in memory or by using an adaptive learning algorithm) calibrated to deliver half-gallon milk cartons to their material deposit location. In another embodiment, control of the ejection airflow force may instead be utilized to selectively deliver captured objects to different material deposit locations. In other words, sorting control logic and electronics 160 may control the airflow from object ejection airflow generator 222 to deliver a first captured object to a first material deposit location when the material characterization data identifies the object as belonging to a first material category (such as aluminum cans, for example), and control the force of airflow from object ejection airflow generator 222 to deliver a second captured object to a second material deposit location when the material characterization data identifies the object as belonging to a second material category (such as milk cartons, for example). In another embodiment, the force of airflow from object ejection airflow generator 222 may remain the same, but sorting control logic and electronics 160 may rotate bidirectional air conveyor device 202 to different positions as a function of the material characterization data. In other words, sorting control logic and electronics 160 may dynamically determine the position of bidirectional air conveyor device 202 to a first angle to deliver a first captured object to a first material deposit location when the material characterization data identifies the object as belonging to a first material category (such as aluminum cans, for example), and dynamically determine the position of bidirectional air conveyor device 202 to a second angle to deliver a second captured object to a second material deposit location when the material characterization data identifies the object as belonging to a second material category (such as milk cartons, for example). In still other embodiments, sorting control logic and electronics 160 may dynamically determine both the force of airflow from object ejection airflow generator 222 and the position of bidirectional air conveyor device 202 in order to eject a captured object to one of a plurality of material deposit locations, and/or to account for characteristics of the captured object (for example, estimated weight, aerodynamics, or other characteristics determined from the material characterization data).

In the example of FIG. 3, pressurized air input port 221 of object capture airflow generator 220 is coupled to first pressurized air output port 142 of pneumatic switch 141. Similarly, pressurized air input port 223 of object ejection airflow generator 222 may be coupled to second pressurized air output port 143 of pneumatic switch 141. Air input ports 221 and 223 may be coupled to pneumatic switch 141 using flexible tubing 146, rotatable couplings, and/or other components that accommodate the rotational movements of bidirectional air conveyor device 202 discussed herein. It should be understood that the functions and operations attributed to pneumatic switch 141 in this disclosure may be implemented in any number of ways. For example, pneumatic switch 141 may be implemented using a combination of manifolds, controllable valves, and/or sets of pneumatic switches or other technology for selectively controlling the distribution of compressed air.

When pneumatic switch 141 receives airflow control signal 161 from sorting control logic and electronics 160 to perform a capture action, pneumatic switch 141 controls an output of first output port 142 to supply pressurized air to pressurized air input port 221 of object capture airflow generator 220. In some embodiments, sorting control logic and electronics 160 may output a binary on/off control signal so that pneumatic switch 141 either turns the pressurized air to pressurized air input port 221 of object capture airflow generator 220 on or off. In other embodiments, sorting control logic and electronics 160 may output a (e.g., dynamically determined) variable control signal to pneumatic switch 141 that indicates an amount of pneumatic airflow to be applied to pressurized air input port 221 of object capture airflow generator 220. In this way, sorting control logic and electronics 160 can variably control the vacuum force applied by bidirectional air conveyor device 202 to target object 55 during a capture action.

When pneumatic switch 141 receives airflow control signal 161 from sorting control logic and electronics 160 to perform an ejection action, pneumatic switch 141 controls an output of second output port 143 to supply pressurized air to pressurized air input port 223 of object ejection airflow generator 222 of bidirectional air conveyor device 202. In some embodiments, sorting control logic and electronics 160 may output a binary on/off control signal so that pneumatic switch 141 either turns the compressed air to pressurized air input port 223 of object ejection airflow generator 222 on or off. In other embodiments, sorting control logic and electronics 160 may output a (e.g., dynamically determined) variable control signal to pneumatic switch 141, where the variable control signal indicates an amount of pneumatic airflow to be supplied to pressurized air input port 223 of object ejection airflow generator 222 of bidirectional air conveyor device 202. In this way, sorting control logic and electronics 160 can variably control the positive pressure (e.g., ejection) force applied by bidirectional air conveyor device 202 to target object 55 during an ejection action to eject a captured target object into a deposit location or an obstruction out of bidirectional air conveyor device 202.

In some embodiments, while pneumatic switch 141 provides pressurized air to both air input ports 221 and 223 of bidirectional air conveyor device 202, pneumatic switch 141 does not control the direction or type of pressure (e.g., positive or negative) of the airflow that flows through bidirectional air conveyor device 202. Rather, a respective set of physical features (which are sometimes referred to as an "airflow generator") corresponding to each of air input ports 221 and 223 within the interior of bidirectional air conveyor device 202 is configured to generate either a negative or positive pressure based on the supplied pressurized air. Specifically, object capture airflow generator 220 corresponding to air input port 221 is configured to generate a negative pressure airflow (e.g., to allow the bidirectional air conveyor device to perform a capture action) when pneumatic switch 141 is controlled to supply pressurized air into air input port 221. Furthermore, object ejection airflow generator 222 corresponding to air input port 223 is configured to generate a positive pressure airflow (e.g., to eject content out of or away from bidirectional air conveyor device 202) when pneumatic switch 141 is controlled to supply pressurized air into air input port 223, as will be described in further detail below.

While FIG. 3 shows a single pneumatic switch, pneumatic switch 141, that is configured to supply pressurized air to both air input ports 221 and 223 of bidirectional air conveyor device 202, in some embodiments, a separate pneumatic switch can supply pressurized air to each of air input ports 221 and 223 of bidirectional air conveyor device 202.

In some embodiments, bidirectional air conveyor device 202 may comprise material obstruction sensor 150 (for example, at outlet port 216) that sends feedback signal 151 to sorting control logic and electronics 160 to indicate when a target object has been successfully captured, or alternately, to indicate when an obstruction has been detected with respect to bidirectional air conveyor device 202. Sensor 150 is not limited to any particular technology, and may comprise, for example, a pressure sensor, airflow sensor, ultrasonic sensor, infrared sensor, image sensor, opacity sensor, or the like. In some embodiments, when sensor 150 detects an obstruction, sorting control logic and electronics 160 may respond with a control signal to operate pneumatic switch 141 to deactivate object capture airflow generator 220, and activate object ejection airflow generator 222 to clear the obstruction from bidirectional air conveyor device 202. In some embodiments, material obstruction sensor 150 is used to detect whether a capture action on target object 55 has been successful. For example, material obstruction sensor 150 can detect that a capture action on target object 55 has been successful where material obstruction sensor 150 determines that after a negative pressure (e.g., vacuum) force is applied on target object 55, the pressure that is detected by material obstruction sensor 150 drops by at least a predetermined amount. In some embodiments, when feedback signal 151 indicates a successful capture action where target object 55 has been captured by (e.g., is adhering to) intake port 214 or attachment 210 of bidirectional air conveyor device 202, sorting control logic and electronics 160 may respond with an airflow control signal to operate pneumatic switch 141 to deactivate supplying pressurized air to object capture airflow generator 220 via air input port 221. Alternatively, if material obstruction sensor 150 detects an obstruction, sorting control logic and electronics 160 may respond with an airflow control signal to operate pneumatic switch 141 to deactivate supplying pressurized air to object capture airflow generator 220 via air input port 221, and instead activate supplying pressurized air to object ejection airflow generator 222 via air input port 223 to eject the obstruction from bidirectional air conveyor device 202 using a positive pressure, ejection airflow.

It should also be understood that activation and deactivation of either object capture airflow generator 220 or object ejection airflow generator 222 may also, in some embodiments, be controlled manually by an operator (either locally or remotely) in addition to being controlled by sorting control logic and electronics 160. In some embodiments, sorting control logic and electronics 160 is configured to, instead, or in addition, periodically activate object ejection airflow generator 222 even in the absence of a detected obstruction at the elapse of each ejection period (for example, every 5 minutes) to purge the system of clogs or accumulating particulates.

Figure 4:
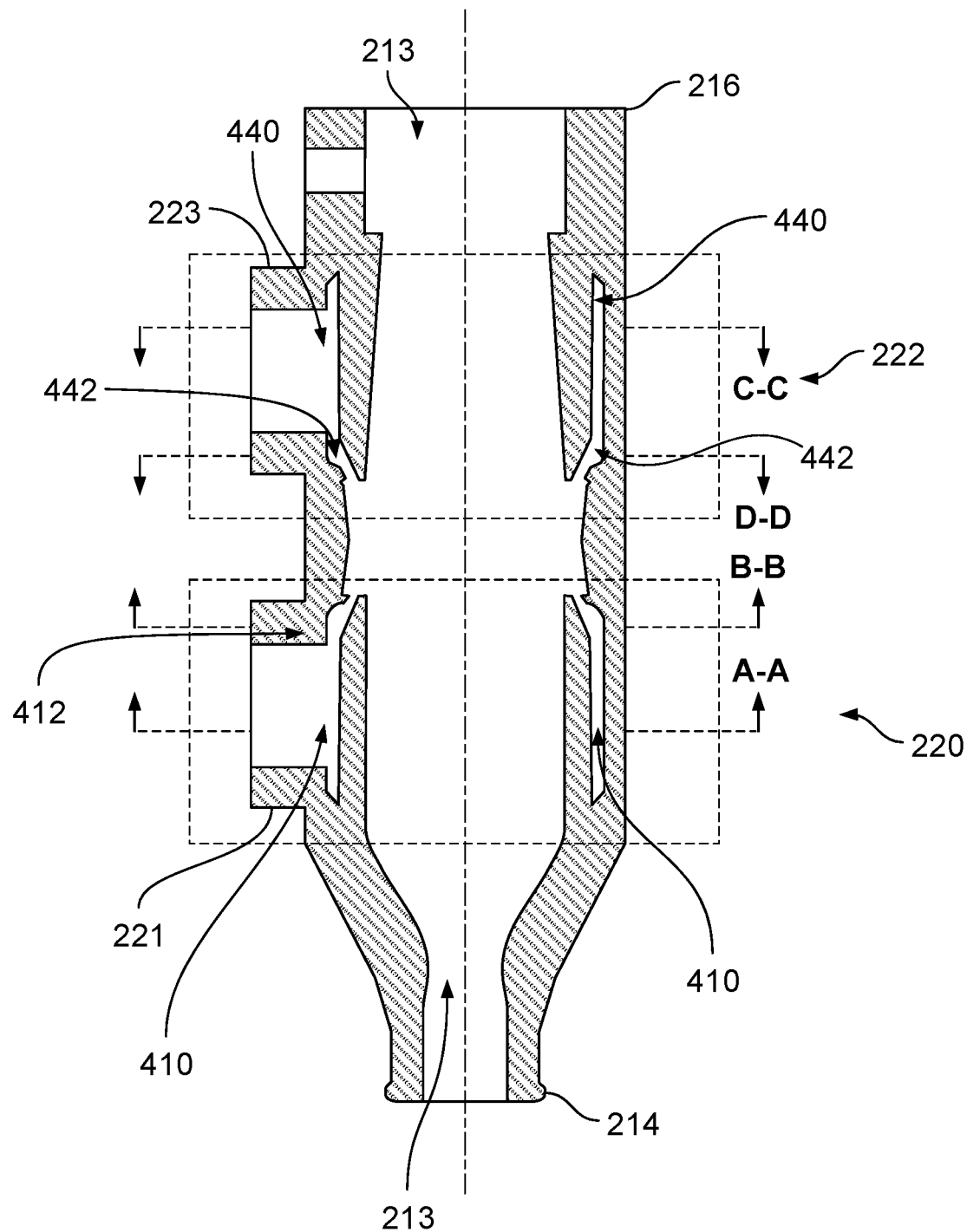
Figure 4C:
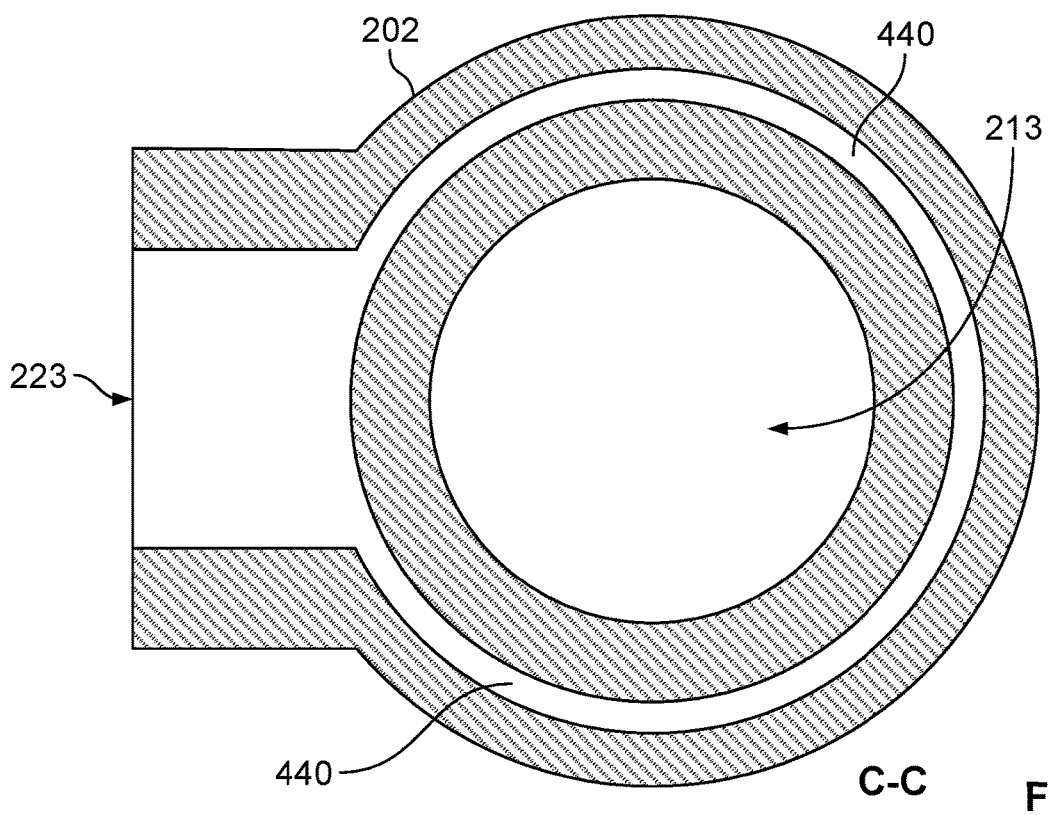
Figure 4D:
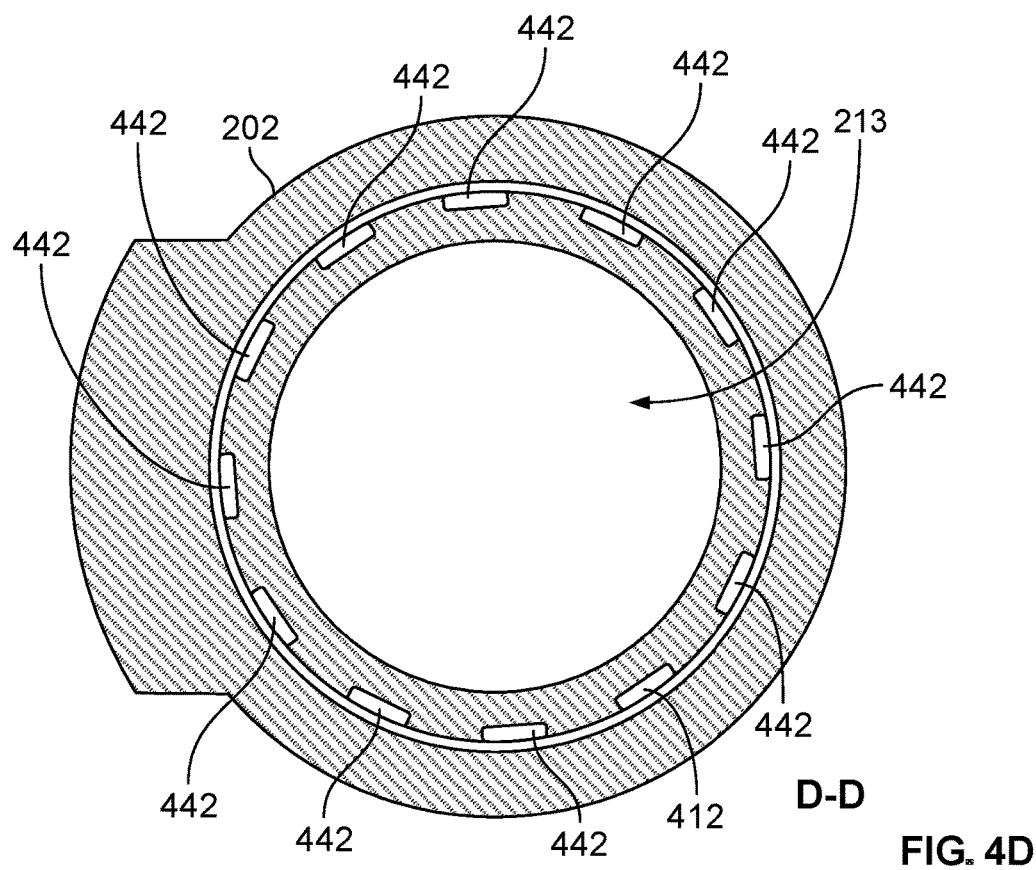

FIGS. 4, 4A and 4B are figures depicting cut-away views of an example bidirectional air conveyor device in accordance with some embodiments. FIG. 4 provides a cut-away side view illustrating the internal structure of two airflow generators 220, 222. FIGS. 4A and 4B provide cross-sectional top views of object capture airflow generator 220 for cross-sections A-A and B-B in accordance with some embodiments. FIGS. 4C and 4D provide cross-sectional top views of object ejection airflow generator 222 for cross-sections C-C and D-D in accordance with some embodiments. In some embodiments, air conveyor device 110 of FIG. 1 may be implemented using the examples of FIGS. 4, 4A, 4B, 4C, and 4D. In some embodiments, bidirectional air conveyor device 202 of FIGS. 2, 2A, 2B, 2C, 2D, 3, 3A, and 3B may be implemented using the examples of FIGS. 4, 4A, 4B, 4C, and 4D.

With respect to object capture airflow generator 220, pressurized air input port 221 is communicatively coupled to first high-pressure air distribution ring 410 within housing 212 that at least partially encircles internal through-passageway 213. A plurality of air ejector nozzles (shown at 412) is coupled to the first high-pressure air distribution ring 410 and positioned around the ring. Air ejector nozzles 412 are positioned to direct compressed air entering the first high-pressure air distribution ring 410 (from pressurized air input port 221) into internal through-passageway 213 in a direction away from intake port 214 and towards outlet port 216. In some embodiments, a tapered shape of air ejector nozzles 412 may be utilized to further compress the air ejected into internal through-passageway 213. The air enters internal through-passageway 213 at high speeds and rapidly expands upon entry to create a relative low pressure region within the housing of the bidirectional air conveyor device that draws an airflow in from intake port 214 and out from outlet port 216. The orientation of air ejector nozzles 412, which directs the expanding compressed air away from intake port 214 and towards outlet port 216, establishes the directionality of the airflow through the bidirectional air conveyor device to be in from intake port 214 and out from outlet port 216 so that materials (e.g., target objects 55) that are located below intake port 214 (e.g., on a conveyor mechanism) may be captured/suctioned/vacuumed by the bidirectional air conveyor device. The force of the airflow generated by object capture airflow generator 220 may be controlled as a function of the pressure and/or volume of air delivered to pressurized air input port 221 and/or the design (e.g., the taper) of air ejector nozzles 412, at least.

With respect to object ejector airflow generator 222, pressurized air input port 223 is communicatively coupled to second high-pressure air distribution ring 440 within housing 212 that at least partially encircles internal through-passageway 213. A plurality of air ejector nozzles (shown at 442) is coupled to the second high-pressure air distribution ring 440 and positioned around the ring. Air ejector nozzles 442 are positioned to direct pressurized air entering the second high-pressure air distribution ring 440 (from pressurized air input port 223) into internal through-passageway 213 in a direction towards intake port 214 and away from outlet port 216. In some embodiments, a tapered shape of air ejector nozzles 442 may be utilized to further compress the air ejected into internal through-passageway 213. The air enters internal through-passageway 213 at high speeds and rapidly expands upon entry to create a relative low pressure region within the housing of the bidirectional air conveyor device that draws an airflow in from outlet port 216 and out from intake port 214. The orientation of air ejector nozzles 442 that directs the expanding compressed air away from outlet port 216 and towards intake port 214 at a high velocity establishes the directionality of the airflow through the bidirectional air conveyor device to be in from outlet port 216 and out from intake port 214 so that obstructions may be ejected from the bidirectional air conveyor device through intake port 214. The force of the airflow generated by the object ejector airflow generator 222 may be controlled as a function of the pressure and/or volume of air delivered to pressurized air input port 223 and/or the design (e.g., the taper) of air ejector nozzles 442, at least.

Figure 5:
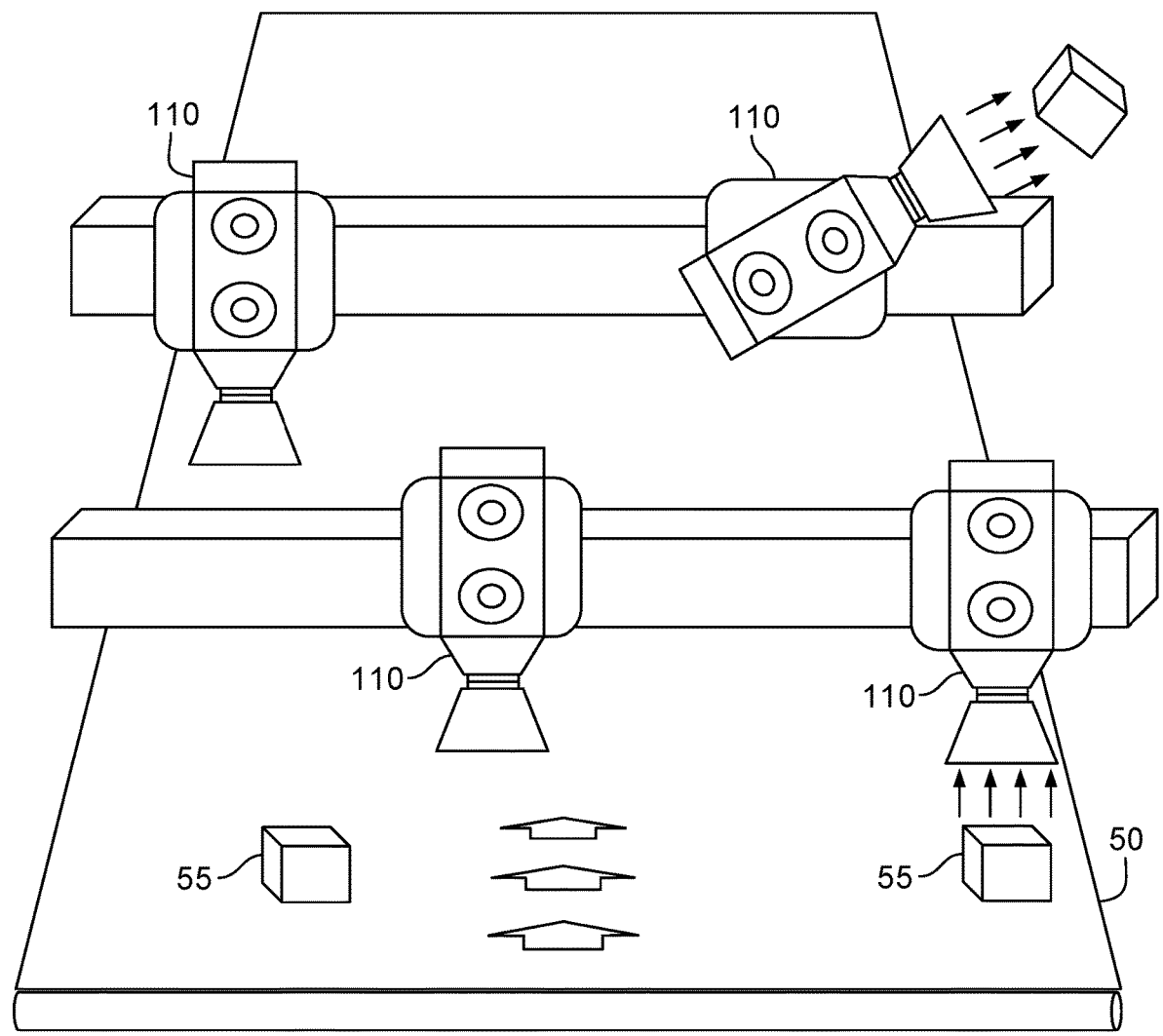
FIG. 5 is a diagram illustrating an arrangement of air conveyor devices for one example material extraction assembly in accordance with some embodiments.

Returning to FIG. 1, it should be understood that in alternate implementations, one or more instances of air conveyor device 110 may be positioned around conveyor mechanism 50 in various arrangements or geometries. That is, in some embodiments, material extraction assembly 100 may comprise one or more rows of instances of air conveyor device 110 arranged in a line across conveyor mechanism 50 such as shown in FIG. 1 and FIG. 5. Sorting control logic and electronics 160 may thus actuate a selected instance of air conveyor device 110 that is best aligned for capturing target object 55 (for example, based on the position of target object 55 on conveyor mechanism 50). FIG. 5 shows an example arrangement of air conveyor devices in which two rows of air conveyor devices are placed over a conveyor mechanism. In the example of FIG. 5, each row includes two instances of air conveyor device 110.

Where material sorting system 10 does comprise a plurality of air conveyor devices 110, they need not be uniform in size. For example, material extraction assembly 100 may comprise one or more instances of air conveyor device 110 of a first size, and one or more instances of air conveyor device 110 of a second size. They also need not be uniform in geometry. For example, sorting control logic and electronics 160 may determine from generated material characterization data that target object 55 has a certain characteristic (for example, size, shape, orientation, material type or composition, or any other characteristic or distinguishing properties discernible by sorting control logic and electronics 160) and correlate that characteristic with a specific instance of air conveyor device 110 of material extraction assembly 100 that is best suited for capturing objects having that characteristic. A particular instance of air conveyor device 110 with narrower diameters may be suitable for flexible materials like bags and sheets whereas another instance of air conveyor device 110 with larger diameters may be more suitable for more rigid objects. For example, an object identified as being a disposable ground-coffee pod may be selected for extraction by an instance of air conveyor device 110 of a first size, while a sheet of plastic wrap may be selected for extraction by another instance of air conveyor device 110 of a smaller size. In some embodiments, neural processing units 164 outputs one or more physical object attributes determined by the one or more neural processing units based on the object data for the one or more target objects appearing in captured image frames.

Figure 6:
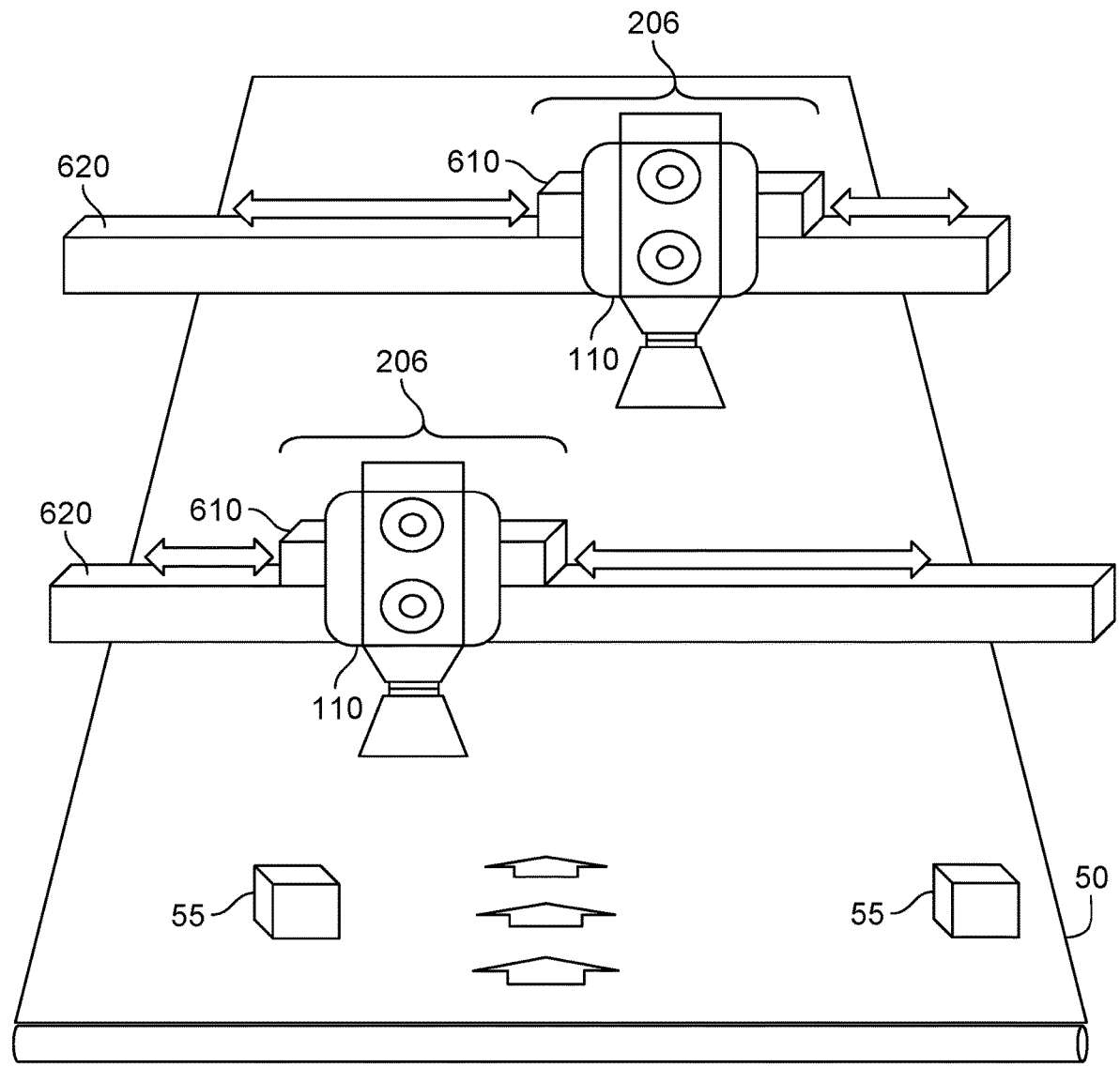
FIG. 6 is a diagram illustrating an arrangement for lateral positioning of an air conveyor device for one example material extraction assembly in accordance with some embodiments.

In some embodiments, instead of having air conveyor device 110 statically mounted, positioning actuator mechanism 206 may further utilize linear positioning either instead of, or in addition to, angular positioning. For example, in some embodiments, air conveyor device 110 may be mounted to a movable carrier controlled by sorting control logic and electronics 160. FIG. 6 illustrates one example positioning actuator coupled to an air conveyor device in which the positioning actuator comprises a movable carrier in accordance with some embodiments. In some embodiments, air conveyor device 110 may be implemented using the examples of air conveyor devices that are shown in FIG. 6. In some embodiments, the example air conveyor devices of FIG. 6 may be implemented using bidirectional air conveyor device 202 of FIGS. 2, 2A, 2B, 2C, 2D, 3, 3A, and 3B. In the example of FIG. 6, an air conveyor device is coupled to a positioning actuator that comprises rotary actuator 204 that is coupled to movable carrier 610. In some embodiments, movable carrier 610 may travel on track 620. Movable carrier 610 can be controlled to laterally move the air conveyor device in either direction along track 620 over the width of conveyor mechanism 50 in order to align the intake port of the air conveyor device with target object 55 during a capture action. During an ejection action, in some embodiments, sorting control logic and electronics 160 can reposition movable carrier 610 to better facilitate its ability to eject captured target object 55 into a desired material deposit location.

Figure 7:
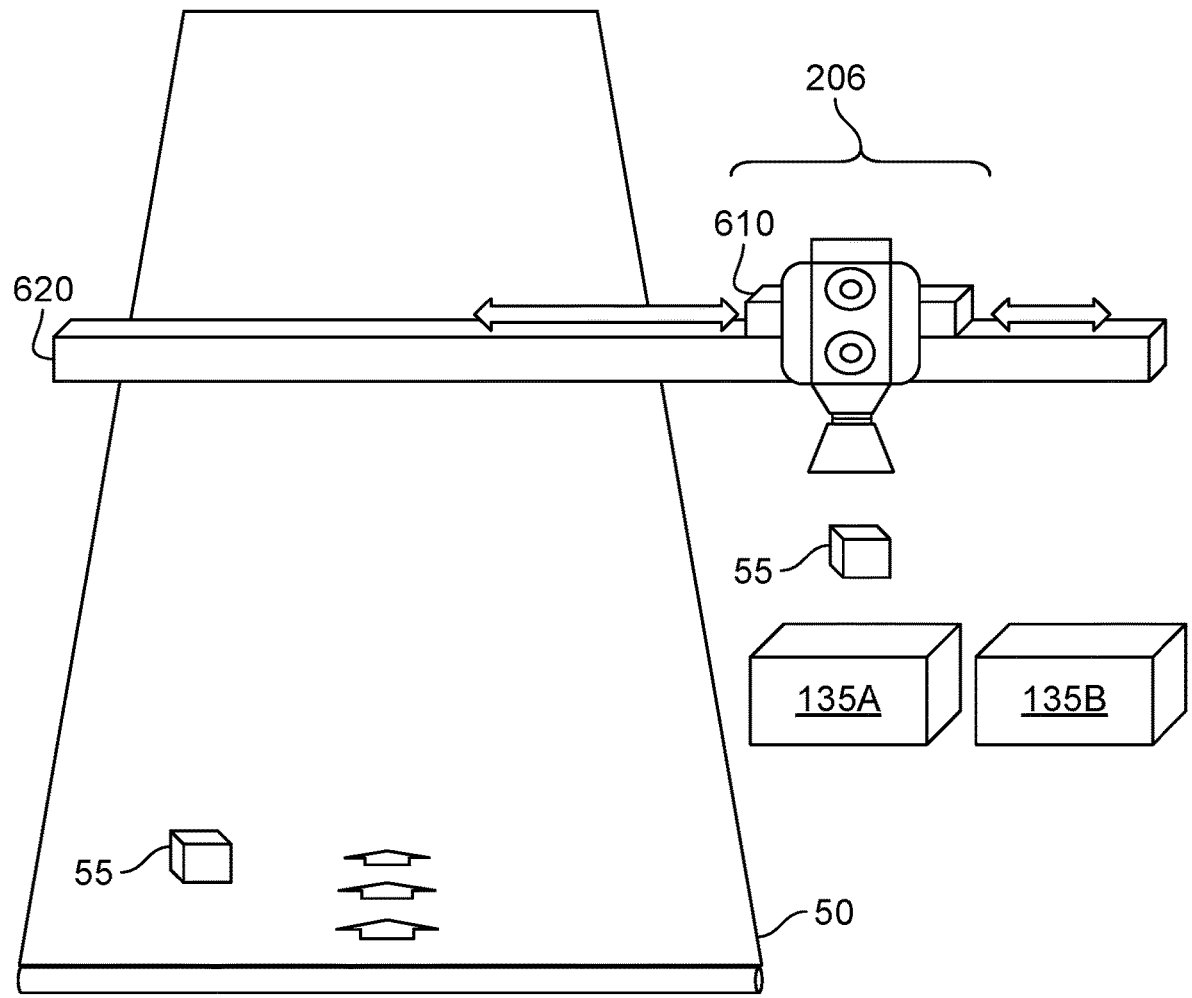
FIG. 7 is a diagram illustrating an example of an air conveyor device utilizing a linear positioning mechanism to deliver a captured target object to a material deposit location in accordance with some embodiments.
Figure 8:
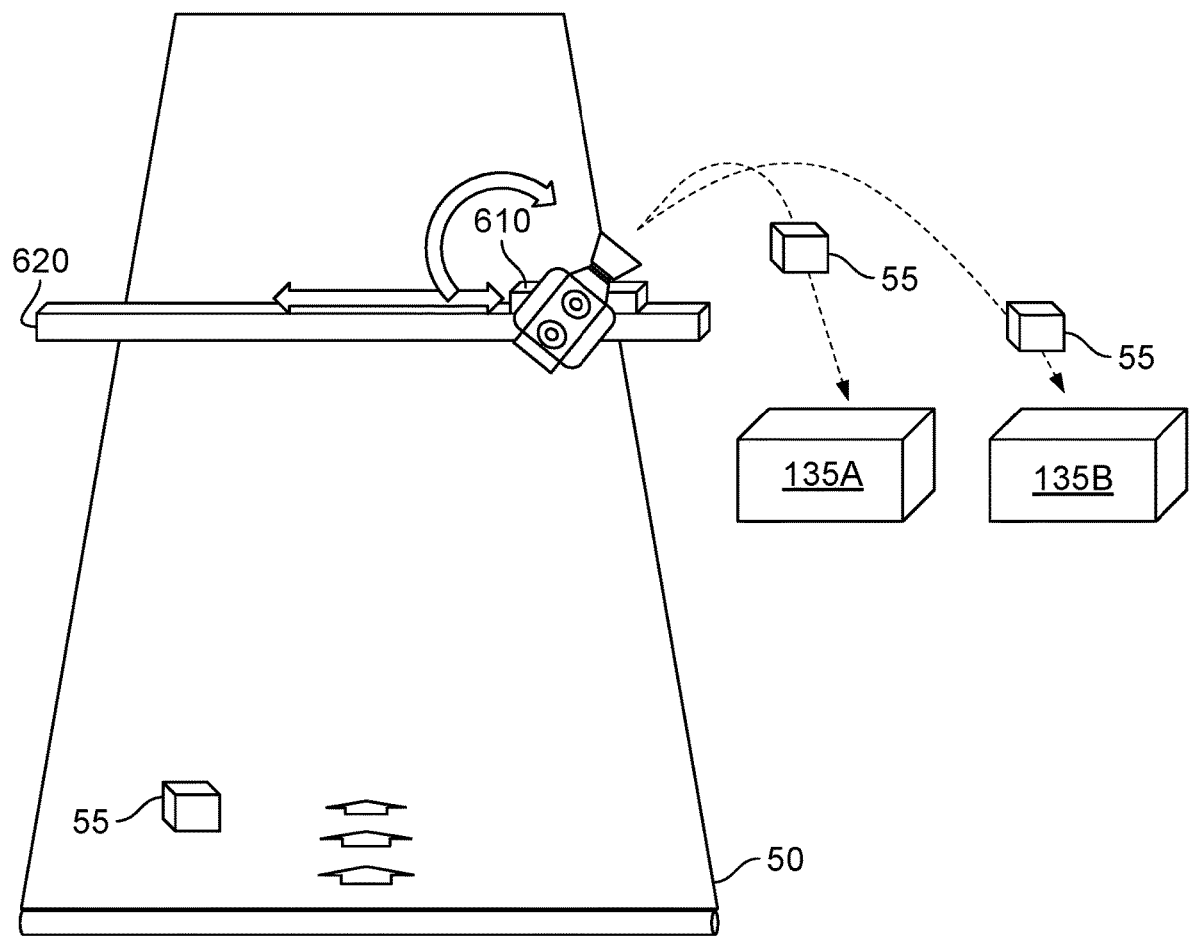
FIG. 8 is a diagram illustrating an example of an air conveyor device utilizing rotational and linear positioning mechanisms to deliver a captured target object to a material deposit location in accordance with some embodiments.

For example, FIG. 7 illustrates one example where an air conveyor device utilizes linear positioning to carry a captured target object to a material deposit location. In some embodiments, air conveyor device 110 may be implemented using the examples of air conveyor devices that are shown in FIG. 7. In some embodiments, the example air conveyor devices of FIG. 7 may be implemented using bidirectional air conveyor device 202 of FIGS. 2, 2A, 2B, 2C, 2D, 3, 3A, and 3B. Once the air conveyor device is positioned over desired receptacle 135A or 135B, the air conveyor device ejects captured target object 55. In some embodiments, sorting control logic and electronics 160 can reposition the air conveyor device to an appropriate receptacle based on identified characteristics of target object 55. In such an embodiment where no rotation of the air conveyor device is needed during ejection, positioning actuator mechanism 206, which is coupled to the air conveyor device, need not comprise a rotator actuator component. For example, positioning actuator mechanism 206 may comprise just movable carrier 610, or another linear positioning mechanism. In other embodiments, such as illustrated in FIG. 8, a positioning actuator mechanism coupled to an air conveyor device includes both rotational and linear positioning mechanisms. In some embodiments, air conveyor device 110 may be implemented using the examples of air conveyor devices that are shown in FIG. 8. In some embodiments, the example air conveyor devices of FIG. 8 may be implemented using bidirectional air conveyor device 202 of FIGS. 2, 2A, 2B, 2C, 2D, 3, 3A, and 3B. In the example of FIG. 8, the linear positioning mechanism (for example, carrier 610) repositions the air conveyor device to a preset distance from the target material deposit location. The rotational positioning mechanism (for example, rotator actuator 204) rotates the air conveyor device to a preset or a dynamically determined angular position. With both positing mechanisms in position, the air conveyor device ejects target object 55 (as described above) with a ballistic trajectory that will carry target object 55 to its corresponding desired receptacle 135A or 135B. In other embodiments, one or both of the rotational and linear positioning mechanisms may be utilized to dynamically impart a momentum assisted ballistic trajectory to carry target object 55 to desired receptacle 135A or 135B. That is, target object 55 is ejected by the air conveyor device while the rotational and/or linear positioning mechanisms are still in motion so that the inertial momentum possessed by target object 55 carries it to desired receptacle 135A or 135B. In such an embodiment, the speed of the rotational and/or linear positioning mechanisms may be controlled by sorting control logic and electronics 160 to produce the desired amount of momentum in target object 55.

As alternative implementations for any of the embodiments described herein, the ejection force generated by object ejection airflow generator 222 may be augmented (or in some embodiments, even replaced) by utilizing mechanical assisted ejection. That is, a mechanical material ejector mechanism may be coupled to the housing of air conveyor device 110 that applies an outward force onto target object 55 during ejection actions to propel target object 55 away from intake port 214 of air conveyor device 110. Such a mechanical material ejector mechanism may be actuated (e.g., via an ejection control signal from sorting control logic and electronics 160) in addition to (e.g., to supplement) the activation of object ejection airflow generator 222, or selectively instead of activating object ejection airflow generator 222.

Figure 9:
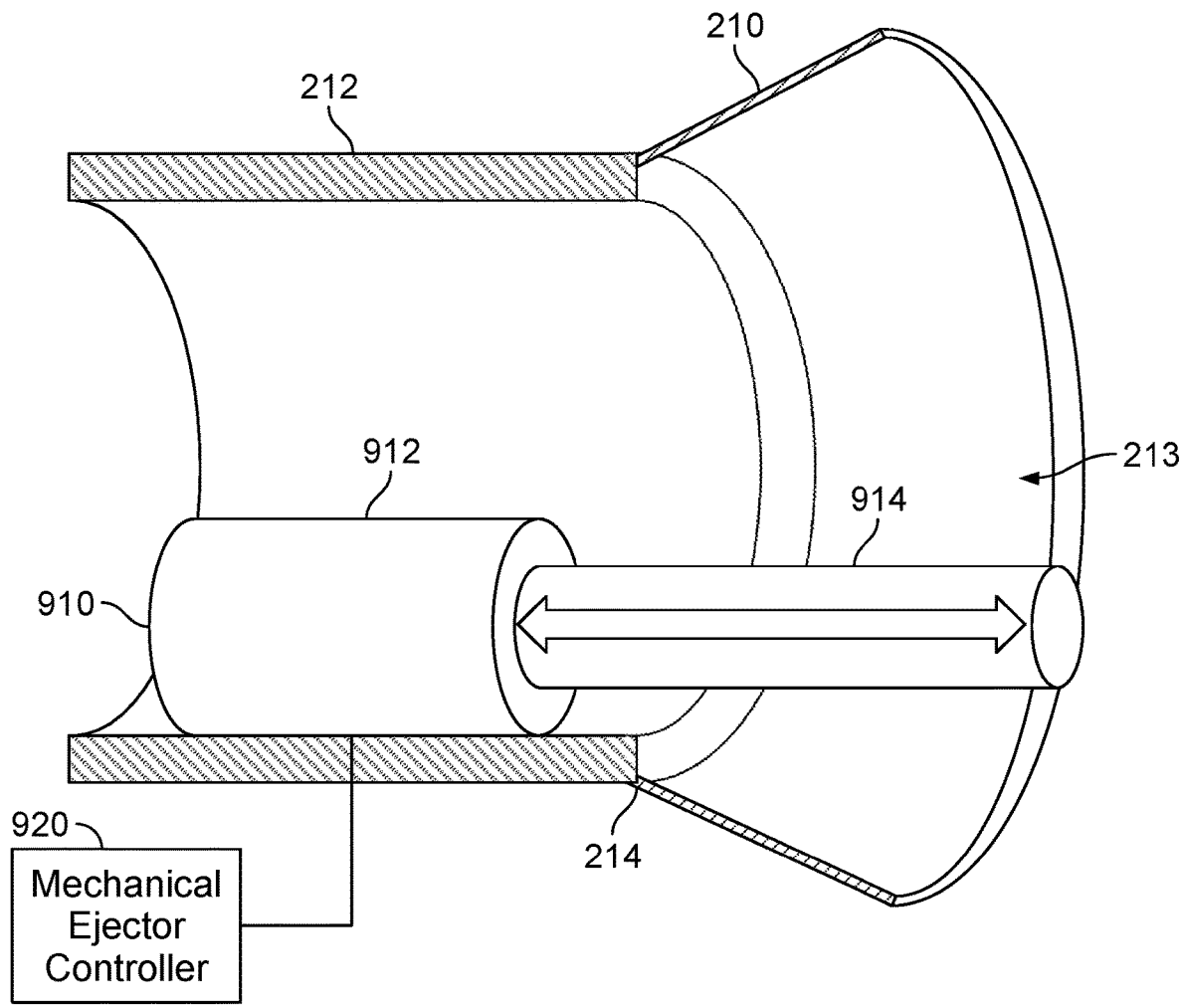
FIGS. 9 and 10 are diagrams illustrating example mechanical material ejector mechanisms in accordance with some embodiments.

FIG. 9 is a diagram illustrating an example in which an air conveyor device includes a mechanical material ejector mechanism in accordance with some embodiments. In particular, FIG. 9 illustrates a partial cut-away view of a lower portion of an air conveyor device 110 of FIG. 1. Specifically, the partial cut-away view shows the portion of housing 212 of the air conveyor device and proximate to its intake port 214. In this particulate illustration, a cut-away view of an optional converging cone attachment 210 coupled to intake port 214 is shown. Mechanical material ejector mechanism 910 is secured to housing 212 of the air conveyor device. In this embodiment, mechanical material ejector mechanism 910 comprises actuator 912 coupled to extendable strike member 914. Actuator 912 may be either electrically or pneumatically controlled by mechanical ejector controller 920. When actuated, actuator 912 quickly projects extendable strike member 914 out from intake port 214 to strike the surface of target object 55 that may have been captured by the air conveyor device. In some embodiments, where attachment 210 is coupled to intake port 214, extendable strike member 914 may have sufficient length to extend out beyond the length of attachment 210. The force of the striking action results in a disengagement of target object 55 from the air conveyor device and propels target object 55 to the desired material deposit location as explained above. In some embodiments, actuator 912 may be implemented using a solenoid and extendable strike member 914 may be implemented by a sliding piston that extends from the solenoid when the solenoid is activated, and returns to a retracted position when the solenoid is deactivated. In other embodiments, actuator 912 may instead comprise a pneumatic linear actuator that extends a sliding piston when the pneumatic linear actuator is activated, and returns to a retracted position when the pneumatic linear actuator is deactivated. In some embodiments, mechanical material ejector mechanism 910 may include a spring that functions to retract extendable strike member 914 when actuator 912 is deactivated. Mechanical ejector controller 920 may be responsive to object ejection control signals initiated by sorting control logic and electronics 160. Mechanical ejector controller 920 may operate in coordinated conjunction with pneumatic switch 141, or be operated by sorting control logic and electronics 160 independently from pneumatic switch 141. In other embodiments, mechanical ejector controller 920 may be an integral component of either sorting control logic and electronics 160 or pneumatic switch 141. Although mechanical material ejector mechanism 910 is shown as being secured to housing 212 at a position within internal through-passageway 213, this is for illustrative purposes and other mounting locations may be used.

Figure 10:
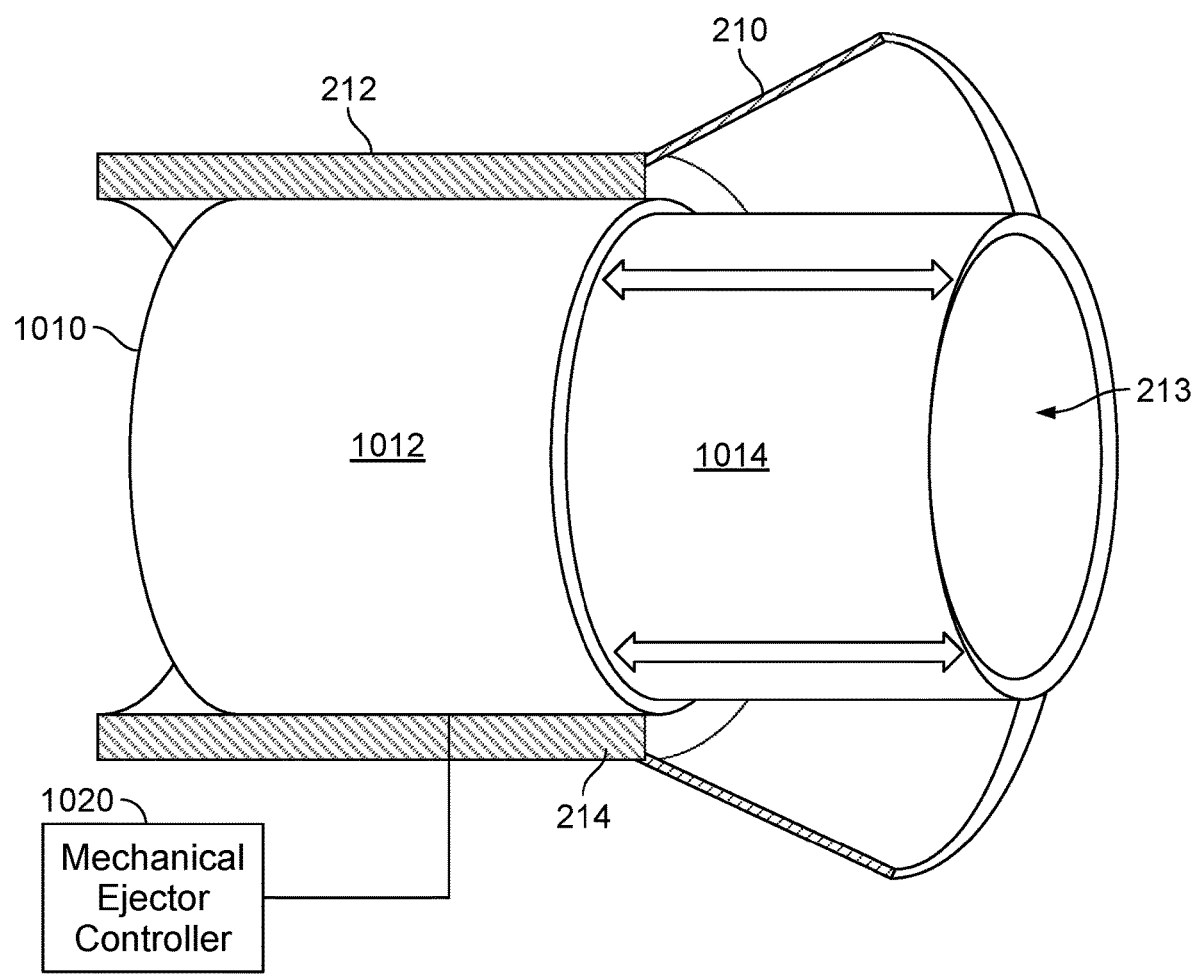

FIG. 10 is a diagram illustrating another example in which an air conveyor device includes a mechanical material ejector mechanism in accordance with some embodiments. In particular, FIG. 10 illustrates a partial cut-away view of a lower portion of an air conveyor device 110 of FIG. 1. Specifically, the partial cut-away view shows the portion of housing 212 of the air conveyor device and proximate to its intake port 214. In this embodiment, mechanical material ejector mechanism 1010 is secured to housing 212 of the air conveyor device within internal through-passageway 213. Mechanical material ejector mechanism 1010 comprises actuator 1012 coupled to extendable strike member 1014. Actuator 1012 may be either electrically or pneumatically controlled by mechanical ejector controller 1020. When actuated, actuator 1012 quickly projects extendable strike member 1014 out from intake port 214 to strike the surface of target object 55 that may have been captured by the air conveyor device. In some embodiments, where attachment 210 is coupled to intake port 214, extendable strike member 1014 may have sufficient length to extend out beyond the length of attachment 210. The force of the striking action results in a disengagement of target object 55 from the air conveyor device and propels target object 55 to the desired material deposit location as explained above. As was the case in FIG. 9, actuator 1012 may be implemented using a solenoid and extendable strike member 1014 by a sliding piston that extends from the solenoid when the solenoid is activated, and returns to a retracted position when the solenoid is deactivated. In other embodiments, actuator 1012 may instead comprise a pneumatic linear actuator that extends a sliding piston when the pneumatic linear actuator is activated, and returns to a retracted position when the pneumatic linear actuator is deactivated. In some embodiments, mechanical material ejector mechanism 1010 may include a spring that functions to retract extendable strike member 1014 when the actuator 1012 is deactivated. A feature distinguishing mechanical material ejector mechanism 1010 of FIG. 10 from mechanical material ejector mechanism 910 of FIG. 9 is that extendable strike member 1014 of FIG. 10 is a hollow member having sides that surround internal through-passageway 213 so that the airflow (whether positive or negative) that flows through internal through-passageway 213 can also flow through extendable strike member 1014. Mechanical ejector controller 1020 may be responsive to object ejection control signals initiated by sorting control logic and electronics 160. Mechanical ejector controller 1020 may operate in coordinated conjunction with pneumatic switch 141, or be operated by sorting control logic and electronics 160 independently from pneumatic switch 141. In other embodiments, mechanical ejector controller 1020 may be an integral component of either sorting control logic and electronics 160 or pneumatic switch 141.

It should be understood that the present disclosure expressly conveys within its scope alternative embodiments where air conveyor device 110 may comprise object capture airflow generator 220, but not necessarily also comprise object ejection airflow generator 222. That is, any of the embodiments described herein may instead comprise an alternative unidirectional air conveyor device 110 having object capture airflow generator 220, without object ejection airflow generator 222. In such alternate embodiments, object ejection action may be performed by including a mechanical material ejector mechanism (such as the example mechanical material ejector mechanisms shown in FIGS. 9 and 10) or through momentum assisted ejections such as described above.

Figure 11:
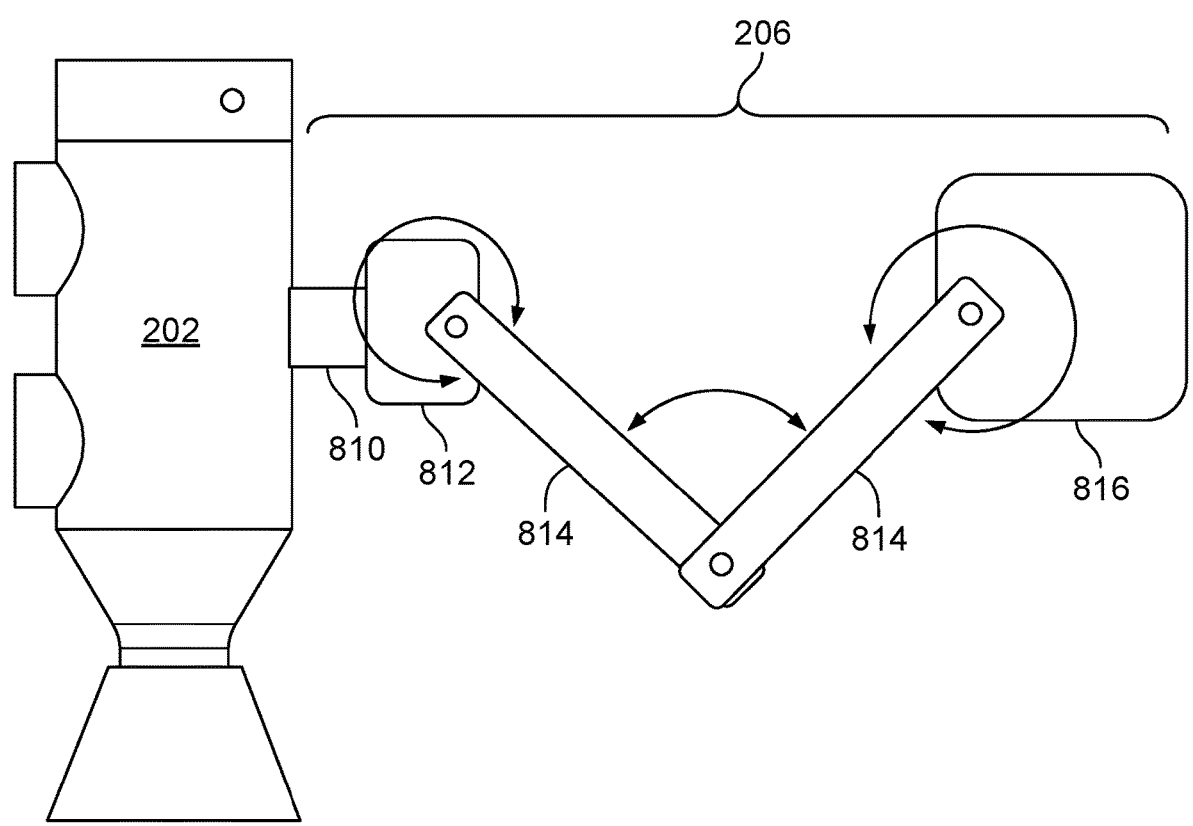
FIG. 11 is a diagram illustrating an alternate example positioning actuator mechanism in accordance with some embodiments.

It should also be understood that rotator actuator 204 and movable carrier 610 are just two examples of positioning actuator mechanisms 206 which may be used in conjunction with implementing material extraction assembly 100 and/or material sorting system 10. Other embodiments may utilize other types of positioning mechanisms to control the position of air conveyor device 110 during either object capture or ejection actions. For example, FIG. 11 discloses yet another embodiment of an air conveyor device coupled to a positioning actuator mechanism. In the example of FIG. 11, the air conveyor device may be implemented by bidirectional air conveyor device 202 of FIGS. 2, 2A, 2B, 2C, 2D, 3, 3A, and 3B. As shown in the example of FIG. 11, positioning actuator mechanism 206 may comprise a combination of different actuators and articulating members under the control of sorting control logic and electronics 160. For example, positioning actuator mechanism 206 may optionally include rotator actuator 812 where the air conveyor device is pivotally coupled to rotator actuator 812 by positioning shaft 810. In some embodiments, positioning actuator mechanism 206 may be optionally rigidly fixed to a member of material extraction assembly 100 and/or material sorting system 10. In other embodiments, positioning actuator mechanism 206 may be secured to an optional movable carrier 816 that provides linear positioning with respect to an axis or plane. In some embodiments, rotator actuator 812 may be directly mounted to movable carrier 816. FIG. 6, above, provides an example of such an embodiment. In still other embodiments, one or more optional articulating members 814 may be used for positioning actuator mechanism 206 together with rotator actuator 812 and/or movable carrier 816 to further add additional degrees of freedom for the air conveyor device during capture and ejection actions.

Figure 12:
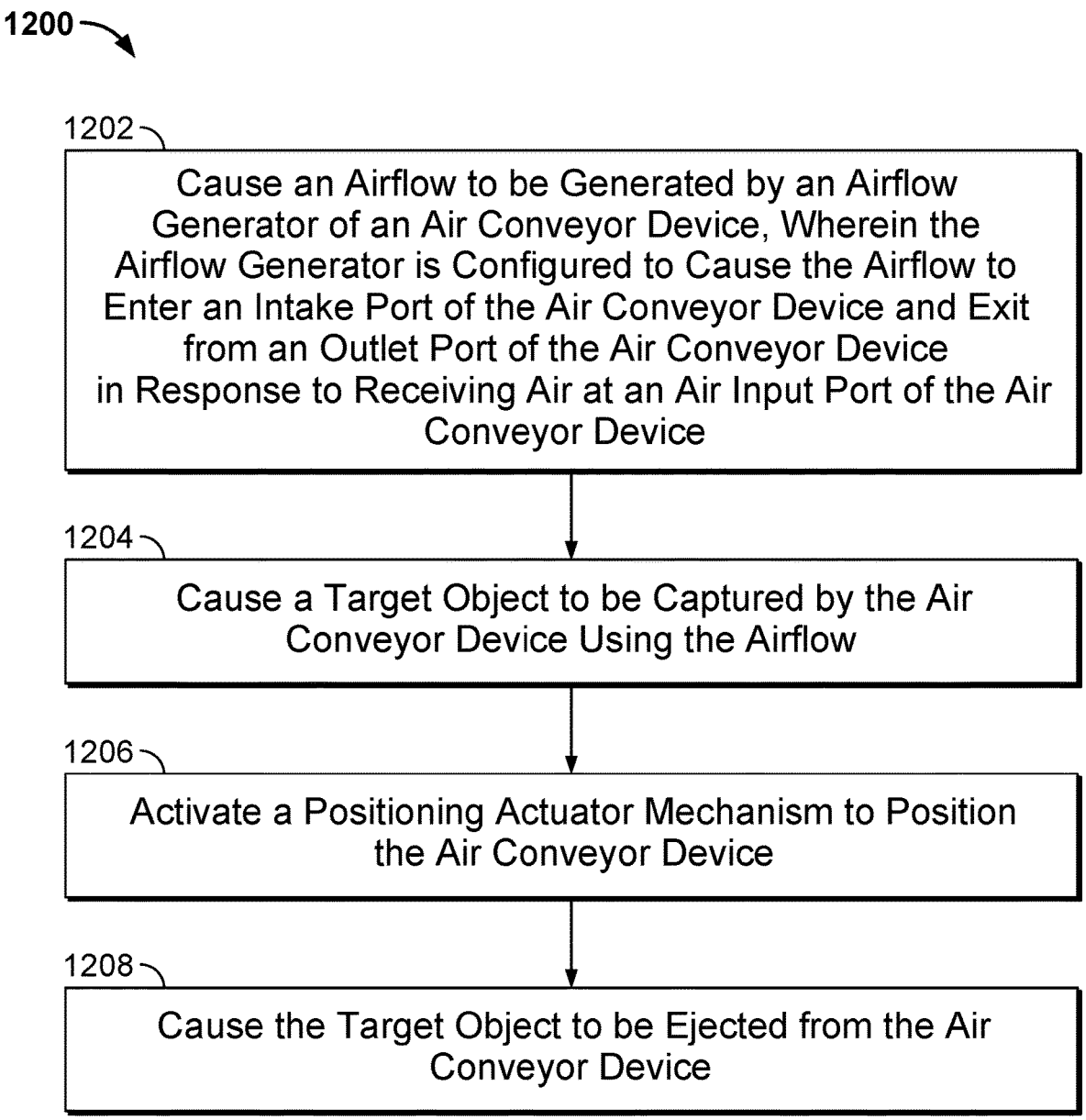
FIG. 12 is a flow diagram showing an embodiment of a process for using an air conveyor device coupled to a positioning actuator mechanism to capture and eject a target object.

FIG. 12 is a flow diagram showing an embodiment of a process for using an air conveyor device coupled to a positioning actuator mechanism to capture and eject a target object. In some embodiments, process 1200 is implemented by sorting control logic and electronics 160 of FIG. 1. It should be understood that the features and elements described herein with respect to the method 1200 shown in FIG. 12 and the accompanying description may be used in conjunction with, in combination with, or substituted for elements of any of the other embodiments discussed with respect to the other figures, or elsewhere herein, and vice versa. Further, it should be understood that the functions, structures, and other descriptions of elements associated with embodiments of FIG. 12 may apply to like named or described elements for any of the other figures and embodiments and vice versa.

At 1202, an airflow is caused to be generated by an airflow generator of an air conveyor device, wherein the airflow generator is configured to cause the airflow to enter an intake port of the air conveyor device and exit from an outlet port of the air conveyor device in response to receiving air at an air input port of the air conveyor device. In some embodiments, objects being transported by a conveyor mechanism are identified (e.g., their attribute information including material type and where they are located on the conveyor mechanism are determined). For example, objects are designated as being "target objects" if they are identified to be of a target material type and objects are designated as being "non-target objects" if they are identified to be of a material type that is not a target material type. Once a target object is identified, the sorting control logic and electronics is configured to send an airflow control signal to a pneumatic control system. In response to receiving the airflow control signal, the pneumatic control system is configured to supply pressurized air into an air conveyor device that is located above the conveyor mechanism. In some embodiments, the airflow control signal indicates for example, which air input port of the air conveyor device to which the pneumatic control system is to supply air and/or the amount of air to supply. The air supplied to the indicated air input port of the air conveyor device is connected to a corresponding airflow generator, which will channel the supplied pressurized air into a negative pressure, vacuum/suction airflow that will flow from the intake port of the air conveyor device to the outlet port of the air conveyor device.

At 1204, a target object is caused to be captured by the air conveyor device using the airflow. As the target object is transported by the conveyor mechanism below the air conveyor device, the generated vacuum/suction force will lift the target object off of the conveyor mechanism and towards the air conveyor device. The target object may become adhered to the intake port (or a corresponding attachment such as a suction cup) of the air conveyor device.

At 1206, a positioning actuator mechanism is activated to position the air conveyor device. After the target object has been captured by the air conveyor device, the sorting control logic and electronics is configured to send a position control signal to the positioning actuator mechanism that is coupled to the air conveyor device. For example, the positioning actuator mechanism comprises a rotator actuator, a movable carrier, a robot, one or more articulating members, or a combination thereof. In response to the position control signal, the positioning actuator mechanism is configured to adjust, if appropriate, the current position of the air conveyor device to facilitate the ejection of the captured target object into a corresponding deposit location. For example, adjusting the position of the air conveyor device includes rotating the air conveyor device to a desired angle, laterally/linearly moving the air conveyor device to a different location over or off of the conveyor mechanism, and/or adjusting the height of the air conveyor device.

At 1208, the target object is caused to be ejected from the air conveyor device. The sorting control logic and electronics is configured to send an ejection control signal and/or another airflow control signal to cause the air conveyor device to eject the target object into its corresponding deposit location. In some embodiments, where the air conveyor device comprises a second airflow generator that is configured to generate a positive pressure ejection airflow that flows from the outlet port of the air conveyor device to the intake port of the air conveyor device, the sorting control logic and electronics is configured to send a second airflow control signal to the pneumatic control system to cause the pneumatic control system to supply pressurized air into a second air input port of an air conveyor device that is connected to this second airflow generator. The ejection airflow that is then created by this second airflow generator is configured to eject the target object. In some embodiments, where the air conveyor device comprises a mechanical material ejector mechanism, the sorting control logic and electronics is configured to send an ejection control signal to the air conveyor device to cause the mechanical material ejector mechanism to extend a strike member outward from the intake port of the air conveyor device to strike the surface of the target object and therefore eject it into a corresponding deposit location. In some embodiments, the air conveyor device comprises both the second airflow generator and the mechanical material ejector mechanism, in which the sorting control logic and electronics may be configured to send control signals to activate both the second airflow generator and the mechanical material ejector mechanism to eject the target object into a corresponding deposit location.

Figure 13:
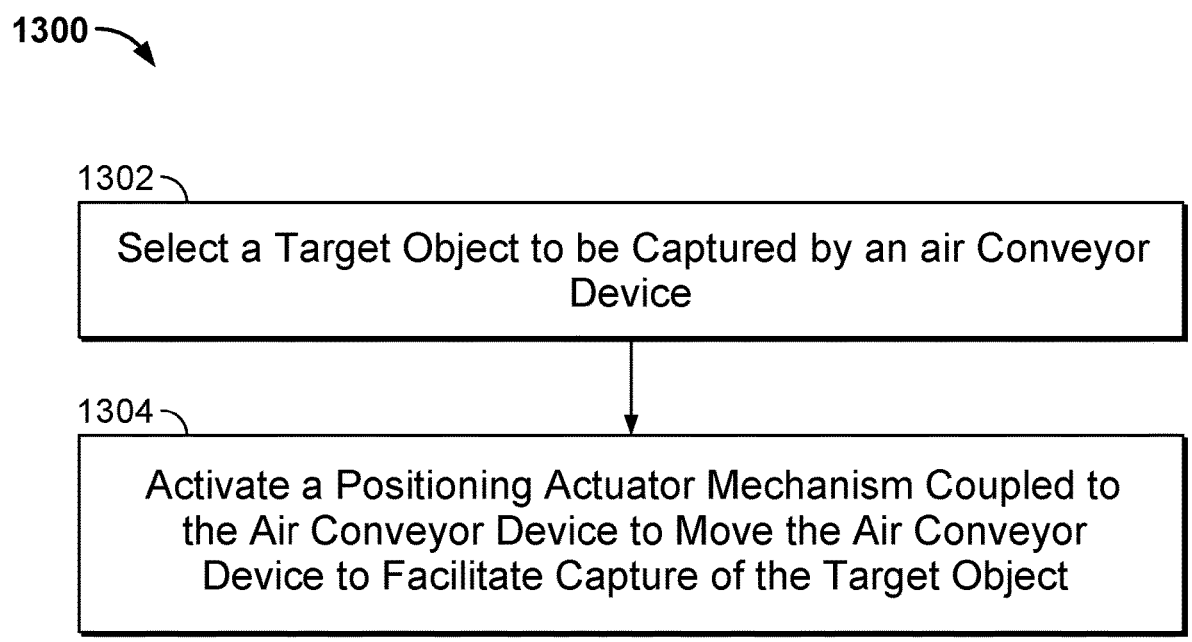
FIG. 13 is a flow diagram showing an example of a process for using an air conveyor device coupled to a positioning actuator mechanism to capture a target object.

FIG. 13 is a flow diagram showing an example of a process for using an air conveyor device coupled to a positioning actuator mechanism to capture a target object. In some embodiments, process 1300 is implemented by sorting control logic and electronics 160 of FIG. 1. In some embodiments, process 1300 may be implemented prior to implementing process 1200 of FIG. 12.

At 1302, a target object is selected to be captured by an air conveyor device. In some embodiments, attribute information and/or location information associated with a target object (e.g., that has been identified from one or more image frames of objects being transported by a conveyor mechanism) is used to select a (next) target object to capture using an air conveyor device. In some embodiments, which target object is selected for an air conveyor device to capture next is determined as a function of one or more, but not limited to the following: the current location of the air conveyor device, the current location of the target object, the deposit location corresponding to the target object, the speed of the conveyor mechanism, an approximated value of the target object, and the current angle of the air conveyor device.

At 1304, a positioning actuator mechanism coupled to the air conveyor device is activated to move the air conveyor device to facilitate capture of the target object. The sorting control logic and electronics is configured to send a position control signal to a positioning actuator mechanism that is coupled to the air conveyor device to cause the positioning actuator mechanism to adjust the current position of the air conveyor device to better align it with the selected target object. For example, the positioning actuator mechanism comprises a rotator actuator, a movable carrier, a robot, one or more articulating members, or a combination thereof. In response to the position control signal, the positioning actuator mechanism is configured to adjust, if appropriate, the current position of the air conveyor device to facilitate the capture of the selected target object. For example, better aligning the air conveyor device with the selected target object includes moving the air conveyor device such that it is closer to the current location of the selected target object and/or such that the air conveyor device will be directly over the selected target object. For example, the position control signal may include parameters such as a desired angle to which to rotate the air conveyor device, a destination coordinate to which the air conveyor device is to be moved, and/or a desired height over the surface of the conveyor mechanism to which the air conveyor device is to be moved.

Figure 14:
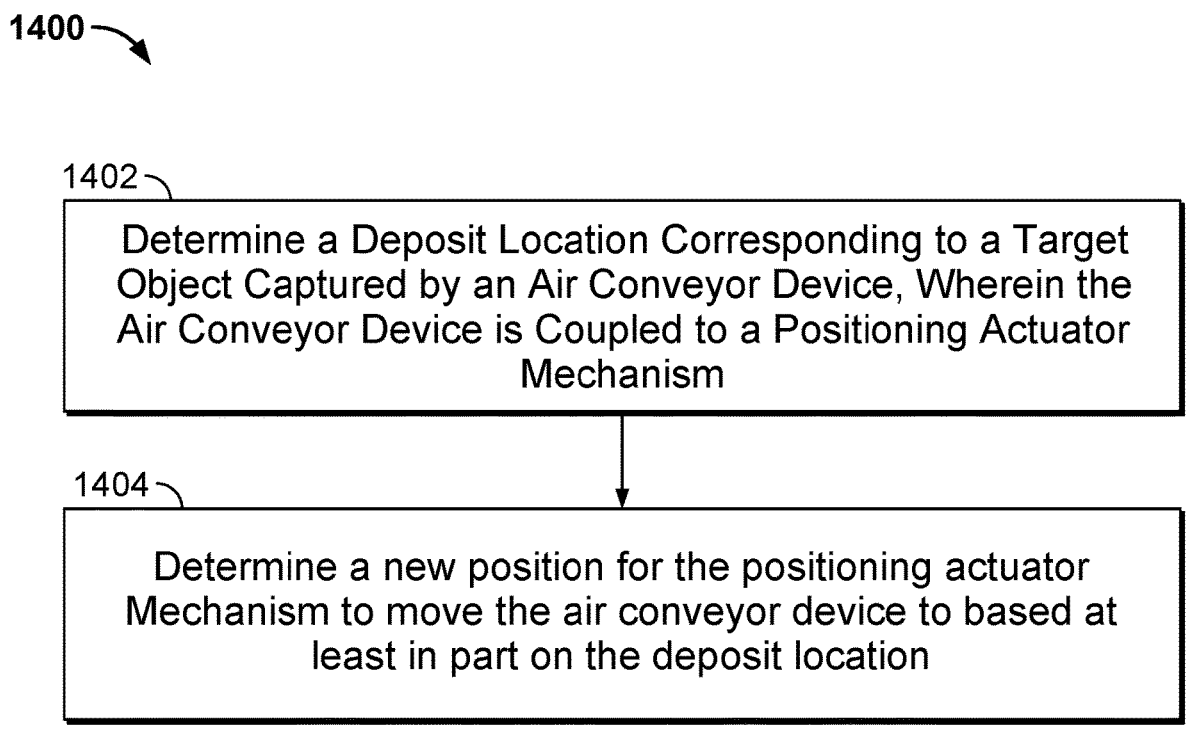
FIG. 14 is a flow diagram showing an example of a process for using an air conveyor device coupled to a positioning actuator mechanism to eject a target object.

FIG. 14 is a flow diagram showing an example of a process for using an air conveyor device coupled to a positioning actuator mechanism to eject a target object. In some embodiments, process 1400 is implemented by sorting control logic and electronics 160 of FIG. 1. In some embodiments, step 1206 of process 1200 of FIG. 12 may be implemented prior to implementing process 1400 of FIG. 14.

At 1402, a deposit location corresponding to a target object captured by an air conveyor device is determined, wherein the air conveyor device is coupled to a positioning actuator mechanism. In some embodiments, a deposit location for a target object is determined based on the material type of the target object and predetermined mappings between material types and deposit locations. In some embodiments, a deposit location is a receptacle that is to the side of a conveyor mechanism on which the target object is being transported, a receptacle at the end of the conveyor mechanism, or a separate target conveyor, for example.

At 1404, a new position for the positioning actuator mechanism to move the air conveyor device to is determined based at least in part on the deposit location. For example, the positioning actuator mechanism comprises a rotator actuator, a movable carrier, a robot, one or more articulating members, or a combination thereof. The new position to move the air conveyor device to may include a new angle to rotate the air conveyor device, a new coordinate over or off of the surface of the conveyor mechanism, and/or a new height relative to the surface of the conveyor mechanism. The new position to move the air conveyor device to may be dynamically determined based at least in part on the deposit location in addition, in some embodiments, to the weight of the target object, the shape of the target object, the speed of the positioning actuator mechanism, and the ejection force to be used on the target object. The new position may be dynamically determined to assure that the ballistic trajectory of the ejected target object will reach the deposit location from the new position of the air conveyor device.

It should be understood that components, elements and features of any of the embodiments described herein may be used in combination. Moreover, it should be understood that in some embodiments, material sorting system 10 may be used in combination or in conjunction with other robotic sorting system technologies. As such, other embodiments are intended to include sorting systems that may comprise combinations of suction grippers, vacuum extraction devices, and other material sorting technologies.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A sorting device, comprising:
a positioning actuator mechanism;
an air conveyor device coupled to the positioning actuator mechanism, wherein the positioning actuator mechanism is configured to actuate the air conveyor device, wherein the air conveyor device comprises:
a housing that includes an intake port and an outlet port, wherein an internal through-passageway connects the intake port and the outlet port;
an air input port; and
an airflow generator defined within the housing, wherein the airflow generator is coupled to the air input port, wherein the airflow generator is configured to cause an airflow to enter the intake port and exit the outlet port in response to a supply of air into the air input port; and
an ejection mechanism associated with the housing, wherein the ejection mechanism is configured to eject air or an object out of the intake port of the air conveyor device.

2. The sorting device of claim 1, wherein the airflow generator comprises:
an air distribution ring disposed within the housing, wherein the air distribution ring is coupled to the air input port; and
a plurality of air ejector nozzles disposed around the air distribution ring, wherein the plurality of air ejector nozzles is positioned within the housing to direct air entering the air distribution ring from the air input port into the internal through-passageway in a direction away from the intake port and towards the outlet port.

3. The sorting device of claim 1, further comprising a material obstruction sensor that outputs a feedback signal.

4. The sorting device of claim 1, the air conveyor device further comprising:
a funnel configured to direct the airflow into the internal through-passageway when the airflow generator is operating.

5. The sorting device of claim 1, wherein the positioning actuator mechanism comprises one or both of a rotational positioning mechanism and a linear positioning mechanism.

6. The sorting device of claim 5, wherein the positioning actuator mechanism comprises the rotational positioning mechanism configured to rotate the air conveyor device to a first position in response to receiving a position control signal.

7. The sorting device of claim 5, wherein the positioning actuator mechanism comprises the rotational positioning mechanism configured to rotate the air conveyor device to one of a plurality of different positions in response to receiving a position control signal.

8. The sorting device of claim 5, wherein the positioning actuator mechanism comprises the linear positioning mechanism configured to move the air conveyor device to a first position in response to receiving a position control signal.

9. The sorting device of claim 5, wherein the positioning actuator mechanism comprises the linear positioning mechanism configured to move the air conveyor device to one of a plurality of different positions in response to receiving a position control signal.

10. The sorting device of claim 5, wherein the positioning actuator mechanism comprises at least one articulating member configured to move the air conveyor device to one of a plurality of different positions in response to receiving a position control signal.

11. The sorting device of claim 1, wherein the air input port comprises a first air input port, wherein the airflow generator comprises a first airflow generator, wherein the ejection mechanism associated with the housing comprises a second air input port and a second airflow generator defined within the housing, wherein the second airflow generator is coupled to the second air input port, wherein the second airflow generator comprises:

a second air distribution ring disposed within the housing, wherein the second air distribution ring is coupled to the second air input port; and a second plurality of air ejector nozzles disposed around the second air distribution ring, wherein the second plurality of air ejector nozzles are positioned within the housing to direct air entering the second air distribution ring from the second air input port into the internal through-passageway in a direction away from the outlet port and towards the intake port.

12. The sorting device of claim 1, wherein the ejection mechanism associated with the housing comprises a mechanical material ejector mechanism coupled to or mounted to the housing, wherein the mechanical material ejector mechanism comprises an actuator coupled to an extendable strike member, wherein the mechanical material ejector mechanism is configured to activate the extendable strike member to extend from the intake port in response to a control signal.

13. The sorting device of claim 12, wherein the mechanical material ejector mechanism is operated by a pneumatic switch.

14. The sorting device of claim 12, wherein the mechanical material ejector mechanism is operated using a solenoid.

15. A sorting system, comprising:
    a processor configured to:
        cause an airflow to be generated by an airflow generator of an air conveyor device, wherein the airflow generator is configured to cause the airflow to enter an intake port of the air conveyor device and exit from an outlet port of the air conveyor device in response to receiving air at an air input port of the air conveyor device;
        cause a target object to be captured by the air conveyor device using the airflow;
        activate a positioning actuator mechanism to position the air conveyor device; and
        cause the target object to be ejected from the air conveyor device; and
    a memory coupled to the processor and configured to provide the processor with instructions.

16. The sorting system of claim 15, wherein the processor is further configured to:
    select the target object to capture by the air conveyor device; and
    activate the positioning actuator mechanism to move the air conveyor device to facilitate capture of the target object.

17. The sorting system of claim 15, wherein to activate the positioning actuator mechanism to position the air conveyor device comprises to:
    determine a deposit location corresponding to the target object; and
    determine a new position for the positioning actuator mechanism to move the air conveyor device to based at least in part on the deposit location.

18. The sorting system of claim 15, wherein the target object is caused to be ejected from the air conveyor device at least partially concurrently with the activating of the positioning actuator mechanism.

19. The sorting system of claim 15, wherein causing the target object to be ejected from the air conveyor device comprises to activate a mechanical material ejector mechanism associated with the air conveyor device.

\* \* \* \* \*